United States Patent
Bao et al.

(10) Patent No.: US 9,749,880 B2
(45) Date of Patent: Aug. 29, 2017

(54) BASE STATION FAILOVER USING NEIGHBORING BASE STATIONS AS RELAYS

(75) Inventors: Derek Hongwei H. Bao, Concord, CA (US); Patricia Ruey-Jane Chang, San Ramon, CA (US); Steven R. Rados, Danville, CA (US); Scott Anthony Townley, Gilbert, AZ (US); Vikram Rawat, San Ramon, CA (US); Maria G. Lam, Oakland, CA (US)

(73) Assignees: Verizon Patent and Licensing Inc., Basking Ridge, NJ (US); Cellco Partnership, Basking Ridge, NJ (US)

( * ) Notice: Subject to any disclaimer, the term of this patent is extended or adjusted under 35 U.S.C. 154(b) by 1500 days.

(21) Appl. No.: 12/828,022

(22) Filed: Jun. 30, 2010

(65) Prior Publication Data

US 2012/0002537 A1  Jan. 5, 2012

(51) Int. Cl.
 *H04W 24/04* (2009.01)
 *H04B 7/26* (2006.01)
 *H04W 88/08* (2009.01)
 *H04W 88/04* (2009.01)
 *H04W 84/04* (2009.01)

(52) U.S. Cl.
 CPC ........... *H04W 24/04* (2013.01); *H04B 7/2606* (2013.01); *H04W 84/047* (2013.01); *H04W 88/08* (2013.01)

(58) Field of Classification Search
 CPC .................................................. H04W 76/028
 USPC ........ 370/216–218, 221, 225–228, 328, 329, 370/331
 See application file for complete search history.

(56) References Cited

U.S. PATENT DOCUMENTS

| | | | |
|---|---|---|---|
| 6,724,731 B1 * | 4/2004 | Shibasaki et al. | 370/251 |
| 6,810,259 B1 * | 10/2004 | Zhang | 455/456.5 |
| 7,839,771 B2 * | 11/2010 | Zeng et al. | 370/225 |
| 7,941,135 B2 * | 5/2011 | Abusch-Magder | 455/423 |
| 8,254,943 B1 * | 8/2012 | Dinan et al. | 455/450 |
| 8,358,577 B1 * | 1/2013 | Khanka et al. | 370/221 |
| 8,693,316 B2 * | 4/2014 | Palanki et al. | 370/225 |
| 2007/0190996 A1 * | 8/2007 | Asthana et al. | 455/420 |
| 2007/0225028 A1 * | 9/2007 | Nelson et al. | 455/524 |
| 2008/0062911 A1 * | 3/2008 | Choi et al. | 370/315 |
| 2008/0171569 A1 * | 7/2008 | Pralle et al. | 455/525 |
| 2010/0014415 A1 * | 1/2010 | Moeller | 370/216 |
| 2010/0322148 A1 * | 12/2010 | Liu et al. | 370/315 |
| 2013/0035033 A1 * | 2/2013 | Sanneck et al. | 455/9 |

* cited by examiner

*Primary Examiner* — Redentor Pasia

(57) ABSTRACT

A method performed by a base station in a network, includes detecting a malfunction associated with a backhaul link to the network; identifying one or more neighboring base stations located within a transmission range of the base station; selecting at least one of the one or more neighboring base stations based on one or more parameters, associated with the one or more neighboring base stations, in response to detecting the malfunction; receiving, by a radio frequency (RF) transceiver associated with the base station, a signal from a user equipment; and transmitting, by an RF transceiver associated with the base station, the signal to the selected at least one of the one or more neighboring base stations.

18 Claims, 14 Drawing Sheets

BASE STATION FAILOVER USING NEIGHBORING BASE STATIONS AS RELAYS

BACKGROUND INFORMATION

Wireless communication networks continue to increase in popularity, leading to increasing numbers of users and to demands for additional services. The increasing numbers of users and implementation of new services result in increased network complexity and drive the development of new standards. The Long Term Evolution (LTE) standard, developed by the Third Generation Partnership Project (3GPP), aims to increase the capacity and speed of wireless communication networks. A main component of the network architecture specified by the LTE standard is the Evolved Packet Core (EPC) network. An EPC network may include nodes and functions that provide Internet Protocol (IP) connectivity to user equipment (UE) for data, voice, and multimedia services.

Wireless UEs may connect to a network via a base station. A base station may receive a wireless signal from a UE and transmit the signal via an electrical or optical connection to the provider network. An LTE base station is called an eNodeB. Each eNodeB may cover a particular geographic area serviced by the EPC network. When an eNodeB does not function properly, UEs in the particular geographic area covered by the eNodeB may experience an interruption in service. Maintaining continuous service coverage in a geographic area covered by an eNodeB that does not function properly may prove to be particularly troublesome.

DETAILED DESCRIPTION OF PREFERRED EMBODIMENTS

The following detailed description refers to the accompanying drawings. The same reference numbers in different drawings identify the same or similar elements. Also, the following detailed description does not limit the invention.

Figure 1A:
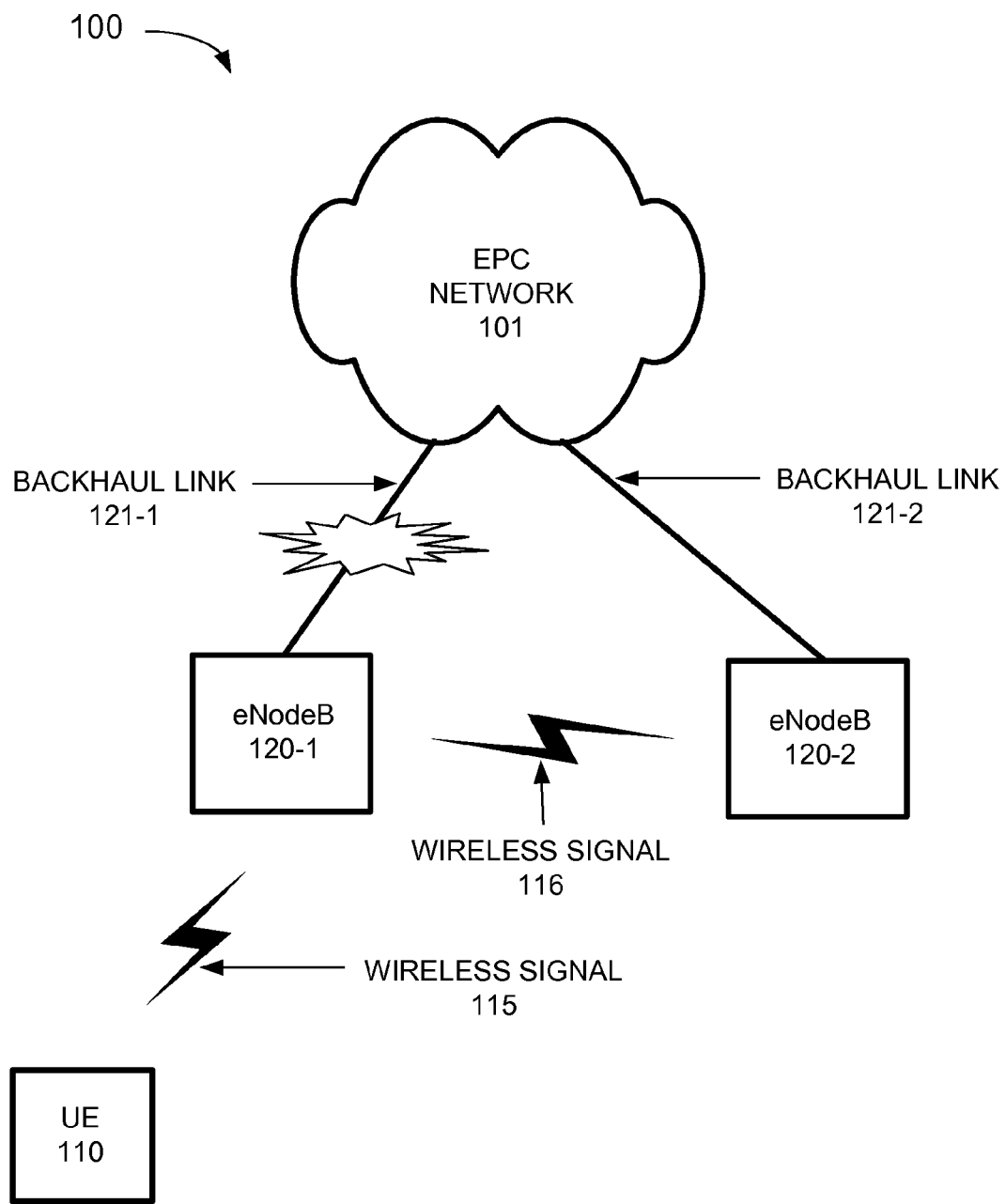
FIG. 1A is a diagram illustrating an overview of an implementation described herein.

FIG. 1A is a diagram illustrating an overview of an implementation described herein. A UE 110 may connect to EPC network 101 via a first eNodeB 120-1. UE 110 may send wireless signals 115 to first eNodeB 120-1 and may receive wireless signals 115 from first eNodeB 120-1. First eNodeB 120-1 may transmit signals received from UE 110 to EPC network 101 via first backhaul link 121-1, and may receive signals for UE 110 from EPC network 101 via first backhaul link 121-1. First backhaul link 121-1 may include an electrical or an optical connection between first eNodeB 120-1 and EPC network 101. For example, backhaul link 121-1 may connect first eNodeB 120-1 to a Mobility Management Entity (MME) device or to a Serving Gateway (SGW).

First backhaul link 121-1 may fail. For example, backhaul link 121-1 may experience a complete interruption of signal transmission or may experience a signal error rate that is higher than a particular error rate threshold. Backhaul link failure may result, for example, from a mechanical break in the electrical or optical connection, a failure in a network node along the path of a backhaul link (e.g., a router or a switch), or a failure in an interface of first eNodeB 120-1 (e.g., a line card). If first backhaul link 121-1 fails, first eNodeB 120-1 may not be able to send and receive signals between UE device 110 and EPC network 101.

An implementation described herein relates to using an eNodeB, which experienced backhaul link failure, as a relay node. For example, in FIG. 1A, if first eNodeB 120-1 loses first backhaul link 121-1, first eNodeB 120-1 may wirelessly transmit signals from UE device 110 to second eNodeB 120-2, which is within transmitting range of the first eNodeB 120-1. Second eNodeB 120-2 may transmit the received signals from first eNodeB 120-1 to EPC network 101 via second backhaul link 121-2, and may receive signals for UE 110 from EPC network 101 via second backhaul link 121-2 and via second eNodeB 120-2.

An implementation described herein may relate to detecting a backhaul link failure by a particular eNodeB, identifying neighboring eNodeBs, selecting one or more neighboring eNodeBs based on one or more parameters, allocating bandwidth to relay UE signals to the selected one or more neighboring eNodeBs, and relaying UE signals to the selected one or more neighboring eNodeBs. The neighboring eNodeBs may be selected, for example, based on usage data associated with a cell of the particular eNodeB, a capacity of a neighboring eNodeB, a signal strength of a neighboring eNodeB, usage data of the neighboring eNodeB, and/or a number of sessions associated with a neighboring eNodeB. Each selected neighboring eNodeB may be assigned a neighbor score and relayed UE traffic may be distributed, by the particular eNodeB, among the selected neighboring eNodeBs based on the assigned neighbor scores.

An implementation described herein may relate to re-transmitting UE packets to a neighboring eNodeB as if the packets were received by the neighboring eNodeB directly from the UE. Another implementation described herein may relate to a particular eNodeB attaching to EPC network 101, via a neighboring eNodeB, as if the particular eNodeB were a UE. The particular eNodeB may relay UE packets by encapsulating UE packets into relay packets. The neighboring eNodeB may treat the particular eNodeB as a UE, and may process relay packets between the particular eNodeB and EPC network 101 as UE packets associated with a same UE.

Additionally, an implementation described herein may relate to detecting a radio frequency (RF) failure of a particular eNodeB, identifying neighboring eNodeBs, distributing UEs served by the particular eNodeB among the identified neighboring eNodeBs, handing UEs over to the identified neighboring eNodeBs, and shutting down the particular eNodeB.

Figure 1B:
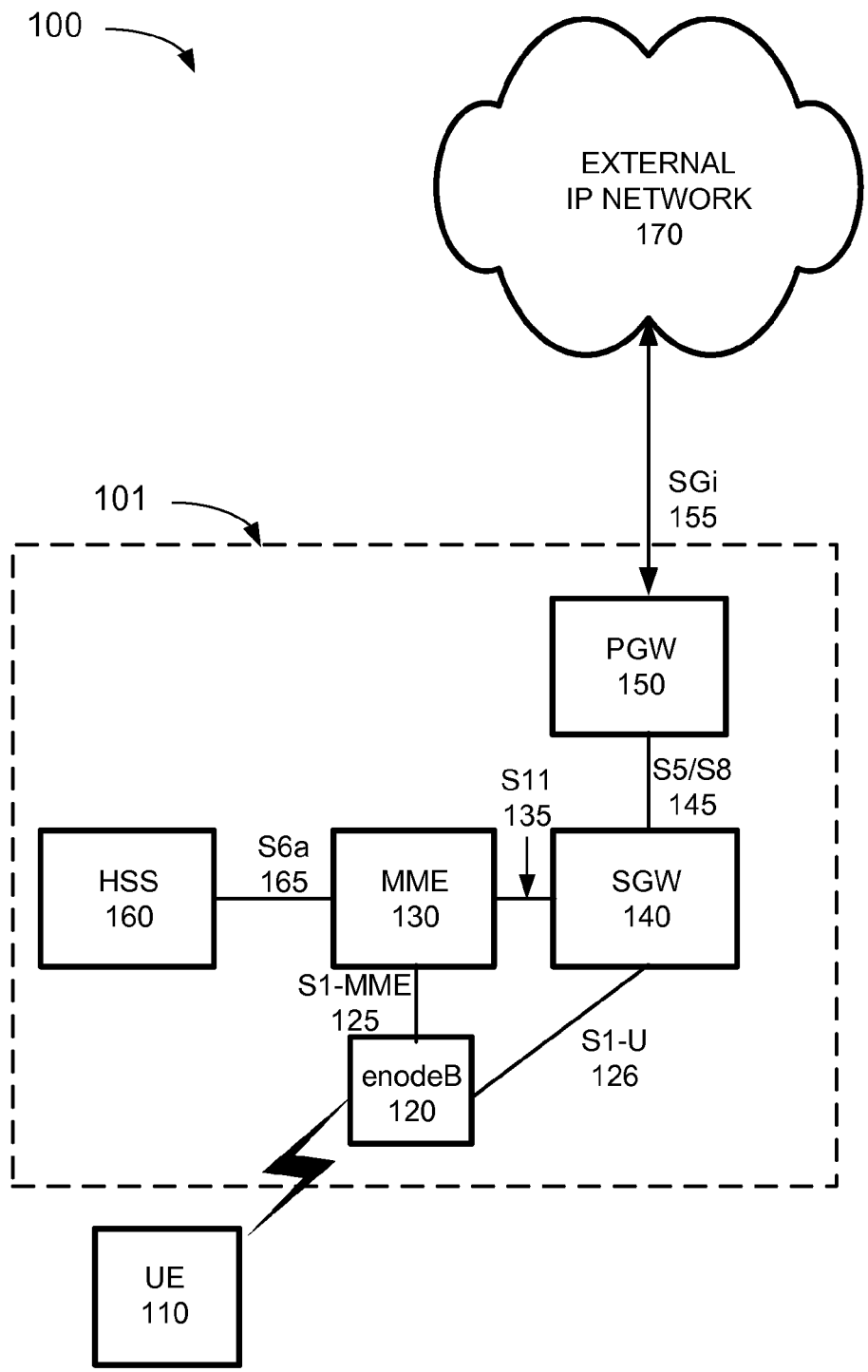
FIG. 1B is a diagram illustrating an example of components of a system according to an implementation described herein.

FIG. 1B is a diagram illustrating example components of system 100 according to an implementation described herein. As shown in FIG. 1B, system 100 may include UE 110, EPC network 101, and an Internet Protocol (IP) external network 170. EPC network 101 may include one or more devices that implement logical entities interconnected via standardized interfaces, and that provide wireless packet-switched services and wireless IP connectivity to UE 110 for both data and voice services. EPC network 101 may allow the delivery of broadband IP services and may interface with external IP network 170 (e.g., an IMS network). EPC network 101 may include an eNodeB 120, a MME device 130, a serving gateway (SGW) device 140, a packet data network gateway (PGW) device 150, and a HSS device 160. While FIG. 1 depicts a single UE 110, eNodeB 120, MME device 130, SGW 140, PGW 150, HSS device 160, and external IP network 170 for illustration purposes, in other implementations FIG. 1 may include multiple UEs 110, eNodeBs 120, MME devices 130, SGWs 140, PGWs 150, HSS devices 160, and/or external IP networks 170.

UE 110 may include any communication device that a user may use to connect to EPC network 101. For example, UE 110 may include a mobile communication device, such as a mobile phone, a personal digital assistant (PDA), a Global Positioning System (GPS) receiver or a media playing device with communication capabilities; a desktop device, such as a personal computer or a workstation; a laptop computer; a telephone terminal; or any other communication device or combinations thereof.

eNodeB 120 may include one or more devices (e.g., base stations) and other components and functionality that allow UE 110 to wirelessly connect to EPC network 101. eNodeB 120 may interface with EPC network 101 via a S1 interface, which may be split into a control plane S1-MME interface 125 and a data place S1-U interface 126. S1-MME interface 125 may interface with MME device 130. S1-MME interface 125 may be implemented, for example, with a protocol stack that includes a Network Access Server (NAS) protocol and/or Stream Control Transmission Protocol (SCTP). S1-U interface 126 may interface with SGW 140 and may be implemented, for example, using a General Packet Radio Service Tunneling Protocol version 2 (GTPv2).

MME device 130 may implement control plane processing for EPC network 101. For example, MME device 130 may implement tracking and paging procedures for UE 110, may activate and deactivate bearers for UE 110, may authenticate a user of UE 110, and may interface to non-LTE radio access networks. A bearer may represent a logical channel with particular quality of service (QoS) requirements. MME device 130 may also select a particular SGW 140 for a particular UE 110. A particular MME device 130 may interface with other MME devices 130 in EPC network 101 and may send and receive information associated with UEs, which may allow one MME device to take over control plane processing of UEs serviced by another MME device, if the other MME device becomes unavailable.

SGW 140 may provide an access point to and from UE 110, may handle forwarding of data packets for UE 110, and may act as a local anchor point during handover procedures between eNodeBs 120. SGW 140 may interface with PGW 150 through an S5/S8 interface 145. S5/S8 interface 145 may be implemented, for example, using GTPv2.

PGW 150 may function as a gateway to external IP network 170 through an SGi interface 155. External IP network 170 may include, for example, an IP Multimedia Subsystem (IMS) network, which may provide voice and multimedia services to UE 110, based on Session Initiation Protocol (SIP). A particular UE 110, while connected to a single SGW 140, may be connected to multiple PGWs 150, one for each packet network with which UE 110 communicates.

MME device 130 may communicate with SGW 140 through an S11 interface 135. S11 interface 135 may be implemented, for example, using GTPv2. S11 interface 135 may be used to create and manage a new session for a particular UE 110. S11 interface 135 may be activated when MME device 130 needs to communicate with SGW 140, such as when the particular UE 110 attaches to EPC network 101, when bearers need to be added or modified for an existing session for the particular UE 110, when a connection to a new PGW 150 needs to created, or during a handover procedure (e.g., when the particular UE 110 needs to switch to a different SGW 140).

HSS device 160 may store information associated with UEs 110 and/or information associated with users of UEs 110. For example, HSS device 160 may store user profiles that include authentication and access authorization information. MME device 130 may communicate with HSS device 160 through an S6a interface 165. S6a interface 165 may be implemented, for example, using a Diameter protocol.

Although FIGS. 1A and 1B show example components of system 100, in other implementations, system 100 may include fewer components, different components, differently arranged components, or additional components than depicted in FIGS. 1A or 1B. Additionally or alternatively, one or more components of system 100 may perform the tasks described as being performed by one or more other components of system 100.

Figure 2:
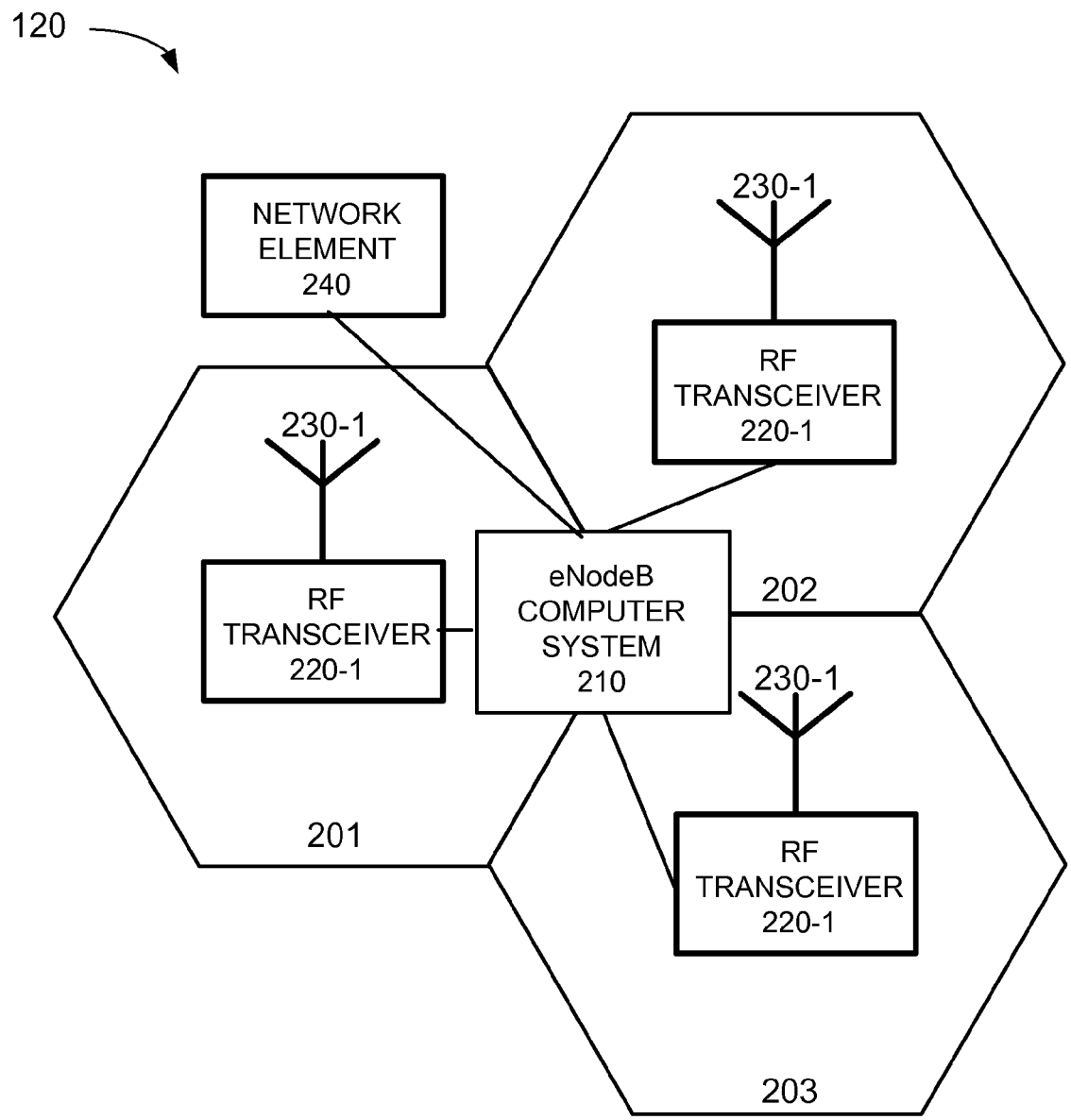
FIG. 2 is a diagram illustrating an example of components of an eNodeB device according to an implementation described herein.

FIG. 2 is a diagram illustrating example components of eNodeB 120 according to an implementation described herein. As shown in FIG. 2, eNodeB 120 may be divided into one or more cells. As an example, in FIG. 2, eNodeB 120 may include a first cell 201, a second cell 202, and a third cell 203. While FIG. 2 illustrates an example with three cells, eNodeB 120 may include a different number of cells. Each cell of eNodeB 120 may cover a particular geographic area. eNodeB 120 may include an eNodeB computer system 210, one or more RF transceivers 220 (referred to collectively as "RF transceivers 220," and individually as "RF transceiver 220"), one or more antenna assemblies 230 (referred to collectively as "antenna assembly 230," and individually as "antenna assemblies 230"), and a network element 240. Each cell of eNodeB 120 may be associated with an RF transceiver and an antenna. Thus, cell 201 may be associated with RF transceiver 220-1 and antenna 230-1, cell 202 may be associated with RF transceiver 220-2 and antenna 230-2, and cell 203 may be associated with RF transceiver 220-3 and antenna 230-3.

eNodeB computer system 210 may include one or more computer devices for performing processing functions associated with eNodeB 120, such as, for example, identifying a particular UE based on a received signal and determining a particular MME device or a particular SGW associated with the particular UE.

RF transceiver 220 may include an RF transmitter that receives signals to be transmitted wirelessly and performs signal processing on the signals before providing the signals to antenna assembly 230, and an RF receiver that receives signals from antenna assembly 230 and performs signal processing on the received signals before providing the received signals to eNodeB computer system 210. For example, RF transceiver 220 may perform analog-to-digital and digital-to-analog conversion, modulation and demodulation, up-conversion and down-conversion, and/or amplification of signals. Antenna assembly 230 may include one or more antennas to transmit and/or receive RF signals over the air. Antenna assembly 230 may, for example, receive RF signals from RF transceiver 220 and transmit them over the air and receive RF signals over the air and provide them to RF transceiver 220. While RF transceivers 220 are illustrated as located in close proximity to eNodeB computer system 210, RF transceivers may be located remotely from eNodeB computer system 120 and coupled to eNodeB computer system 120 via, for example, fiber optic cables. Thus, cells of eNodeB 120 may be geographically distributed and need not be adjacent each other.

Network element 240 may include one or more network elements for communicating with other elements in EPC network 101. For example, network element 240 may include one or more routers. Network element 240 may receive a signal from eNodeB computer system 210 along with an indication Although FIG. 2 shows example components of eNodeB 120, in other implementations, eNodeB 120 may include fewer components, different components, differently arranged components, or additional components than depicted in FIG. 2. Additionally or alternatively, one or more components of eNodeB 120 may perform the tasks described as being performed by one or more other components of eNodeB 120. Furthermore, while FIG. 2 is described in the context of an eNodeB base station, in other implementations, the components of FIG. 2 may represent a base station that does not include an eNodeB base station.

Figure 3:
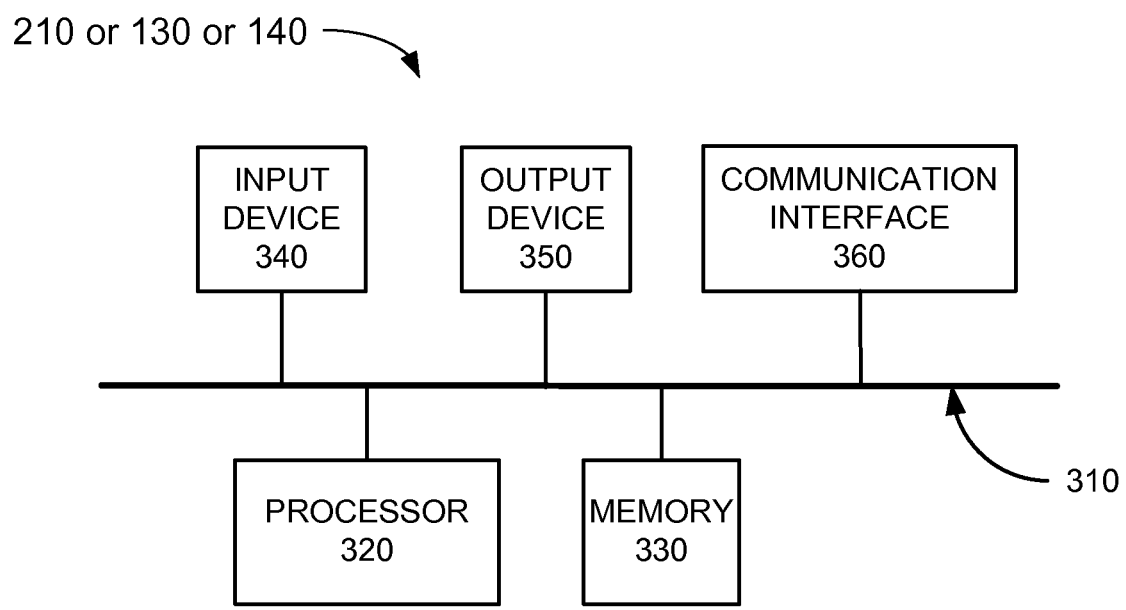
FIG. 3 is a diagram illustrating an example of components of a network node device according to an implementation described herein.

FIG. 3 is a diagram illustrating example components of a device that may correspond to eNodeB computer system 210 of eNodeB 120, MME device 130, or SGW 140, according to an implementation described herein. As shown, the device may include a bus 310, a processor 320, a memory 330, an input device 340, an output device 350, and a communication interface 360.

Bus 310 may include a path that permits communication among the components of the device. Processor 320 may include one or more processors, microprocessors, or processing logic (e.g., application specific integrated circuits (ASICs) or field programmable gate arrays (FPGAs)) that may interpret and execute instructions. Memory 330 may include a random access memory (RAM) device or another type of dynamic storage device that may store information and instructions for execution by processor 320, a read only memory (ROM) device or another type of static storage device that may store static information and instructions for use by processor 320, a magnetic and/or optical recording memory device and its corresponding drive, and/or a removable form of memory, such as a flash memory.

Input device 340 may include a mechanism that permits an operator to input information to the device, such as a keyboard, a mouse, a button, a pen, a touch screen, voice recognition and/or biometric mechanisms, etc. Output device 350 may include a mechanism that outputs information to the operator, including a display, a light emitting diode (LED), a speaker, etc. Communication interface 360 may include any transceiver-like mechanism that enables the device to communicate with other devices and/or systems. For example, communication interface 360 may include mechanisms for communicating with another device or system via a network, such as EPC network 101 or external IP network 170. For example, communication interface 360 may include a modem, a network interface card, or a wireless interface card.

As will be described in detail below, the device 210/130/140 may perform certain operations. The device may perform these operations in response to processor 320 executing software instructions contained in a computer-readable medium, such as memory 330. A computer-readable medium may be defined as one or more logical or physical memory devices. A logical memory device may include space within a single physical memory device or spread across multiple physical memory devices.

The software instructions may be read into memory 330 from another computer-readable medium, or from another device via communication interface 360. The software instructions contained in memory 330 may cause processor 320 to perform processes that will be described later. Alternatively, hardwired circuitry may be used in place of or in combination with software instructions to implement processes described herein. Thus, implementations described herein are not limited to any specific combination of hardware circuitry and software.

Although FIG. 3 shows example components of a device, in other implementations, the device may contain fewer components, different components, additional components, or differently arranged components than depicted in FIG. 3. Additionally or alternatively, one or more components of the device may perform one or more tasks described as being performed by one or more other components of the device.

Figure 4:
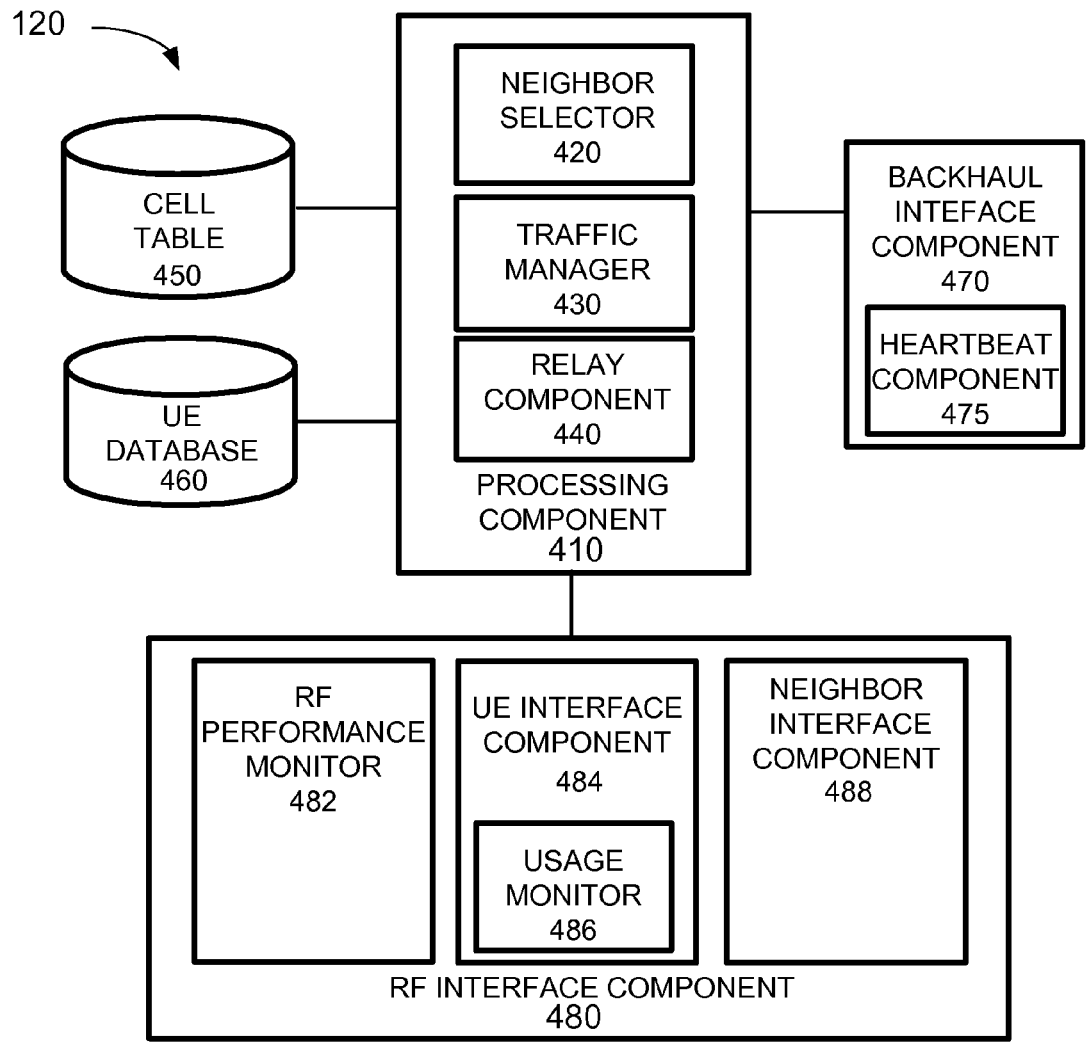
FIG. 4 is a diagram illustrating an example of functional components of an eNodeB device according to an implementation described herein.

FIG. 4 is a diagram illustrating example functional components of eNodeB 120 according to an implementation described herein. As shown in FIG. 4, eNodeB 120 may include a processing component 410, a cell table 450, a UE database 460, a backhaul interface component 470, and an RF interface component 480.

Processing component 410 may perform processing functions and may include a neighbor selector 420, a traffic manager 430, and a relay component 440. Neighbor selector 420 may identify one or more neighboring eNodeB associated with particular cells of eNodeB 120, and may select one or more of the neighboring eNodeBs based on one or more parameters. The one or more parameters may include usage conditions of the cell in which a particular neighboring eNodeB is located, a capacity of the particular neighboring eNodeB, a signal strength of the particular neighboring eNodeB, usage conditions of the particular neighboring eNodeB, and/or a number of sessions associated with the particular neighboring eNodeB. Neighbor selector 420 may assign a neighbor score to each neighboring eNodeB based on the one or more parameters.

Traffic manager 430 may allocate bandwidth for relaying UE signals to one or more neighboring eNodeBs. For example, traffic manager 430 may allocate bandwidth for each cell of eNodeB 120 that includes a neighboring eNodeB with a neighbor score higher than a particular threshold. Traffic manager 430 may distribute UE signals received by eNodeB 120 among the selected neighboring eNodeBs. For example, traffic manager 430 may select, for each cell of eNodeB 120, the neighboring eNodeB with the highest neighbor score, and may distribute UE signals among the cells of eNodeB 120 based on neighbor scores associated with neighboring eNodeBs. For example, traffic manager 430 may relay more UE traffic to a first cell that includes a first neighboring eNodeB with a first neighbor score than to a second cell that includes a second neighboring eNodeB with a second neighbor score, if the first neighbor score is higher than the second neighbor score.

Relay component 440 may receive a packet from a UE and may process the packet before the packet is transmitted to a neighboring eNodeB. For example, relay component 440 may encapsulate the packet into a relay packet. Relay component 440 may receive a relay packet from a neighboring eNodeB and may process the packet before the packet is transmitted to a UE. For example, relay component 440 may retrieve a UE packet from the relay packet.

UE database 460 may store a list of UEs identified as being located within the geographic area served by eNodeB 120. UE database 460 may store additional information associated with particular UE. For example, UE database 460 may identify a particular cell of eNodeB 120 associated with a particular UE. As another example, UE database 460 may store information associating a particular UE 110 with a particular MME device 130 and/or with a particular SGW 140. For example, UE database 460 may store a Globally Unique Temporary Identified (GUTI) associated with a particular UE. Cell table 450 may store information associated with a particular cell of eNodeB 120. Example fields of cell table 450 are described below with reference to FIG. 6A.

Backhaul interface component 470 may interface eNodeB 120 with other elements of EPC network, such as MME device 130 and/or SGW 140. For example, backhaul interface component 470 may implement S1-MME interface 125 and S1-U interface 126. Backhaul interface component 470 may include a heartbeat component 475.

Heartbeat component 475 may send and receive heartbeat messages (e.g., keep-alive packets) from components of EPC network 101 connected to eNodeB 120 through backhaul link 121. For example, heartbeat component 475 may receive, at periodic intervals, messages from MME device 130 and SGW 140, informing eNodeB 120 that MME device 130 and SGW 140 are functioning properly and informing eNodeB 120 that the link between MME device 130 and eNodeB 120 and the link between SGW 140 and eNodeB 120 are functioning properly. Heartbeat component 475 may send heartbeat messages to MME device 130 and/or SGW 140, indicating that eNodeB 120 is functioning properly.

If heartbeat component 475 fails to receive a heartbeat message from MME device 130 or from SGW 140 within a particular time period, heartbeat component 475 may inform processing component 410 that backhaul link 121 has malfunctioned. Additionally or alternatively, heartbeat component 475 may continue to receive heartbeat messages, but may determine, based on information included in the received heartbeat messages, that the error rate of signals transmitted via backhaul link 121 is higher than a particular threshold, and may conclude that backhaul link 121 has malfunctioned. When backhaul link 121 resumes functioning properly, heartbeat component 475 may resume receiving heartbeat messages and may inform processing component 410 that backhaul link 121 has resumed functioning properly.

RF interface component 480 may include RF performance monitor 482, UE interface component 484, and neighbor interface component 488. RF performance monitor 482 may monitor the performance of RF transceivers 220, may detect if a malfunction occurs in one of RF transceivers 220, or if an error rate experienced by one RF transceivers 220 becomes greater than an error threshold, and may inform processing component 410 of the detected malfunction. Processing component 410 may distribute UEs served by eNodeB 120 to neighboring eNodeBs, handover the UEs (e.g., via a logical X2 interface between two eNodeBs implemented via first backhaul link 121-1 and second backhaul link 121-2), and may shut down eNodeB 120.

UE interface component 484 may implement an interface between eNodeB 120 and UEs served by eNodeB 120. For example, UE interface component 484 may implement an Evolved Universal Terrestrial Radio Access Network (E-UTRAN) interface, using Packet Data Convergence Protocol (PDCP) and/or Radio Link Control (RLC) protocol to transmit messages between eNodeB 120 and UE 110. UE interface component 484 may include usage monitor 486. Usage monitor 486 may monitor usage conditions associated with a particular cell of eNodeB 120 and provide information associated with usage conditions of the particular cell of eNodeB 120 to neighbor selector 420. For example, usage monitor 486 may measure the amount of UE traffic being handled by the particular cell, such as the number of active UE sessions, the amount of bandwidth being used by UE signals in relation to the total amount of available bandwidth, an average bit rate associated with UE signals, a noise level associated with UE signals, and/or an error rate associated with UE signal. The usage conditions may be reported as instantaneous values at particular intervals. Additionally or alternatively, the usage conditions may be reported as computed average values over particular intervals.

Neighbor interface component 488 may implement an interface between eNodeB 120 and a neighboring eNodeB. In one implementation, neighbor interface component 488 may transmit UE signals as if the UE signals were transmitted by UE 110. For example, neighbor interface component 488 may re-transmit UE signals using PDCP and RLC protocol. In another implementation, neighbor interface component 488 may transmit UE signals encapsulated in relay packets received from relay component 440.

Neighbor interface component 488 may perform neighbor discovery and identify neighboring eNodeBs for each cell of eNodeB 120. In one implementation, neighbor selector 420 may generate discovery packets and wirelessly transmit the discovery packets via antenna assemblies 230. Neighbor interface component 488 may receive, in response to transmitting a discovery packet, a reporting packet, from a particular neighboring eNodeB, which include information associated with the particular neighboring eNodeB, such as, for example, a capacity, a signal strength, usage data, and/or a number of sessions associated with the particular neighboring eNodeB. Neighbor interface component 488 may receive a discovery packet from a neighboring eNodeB, requesting information, and may, in response to receiving the discovery packet, provide a reporting packet that includes information associated with eNodeB 120. Reporting packets may be exchanged by neighboring eNodeBs at particular intervals, allowing each particular eNodeB to maintain current data about conditions associated with neighboring eNodeBs of the particular eNodeB.

Although FIG. 4 shows example functional components of eNodeB 120, in other implementations, eNodeB 120 may contain fewer functional components, different functional components, differently arranged functional components, or additional functional components than depicted in FIG. 4. Additionally or alternatively, one or more functional components of eNodeB 120 may perform one or more other tasks described as being performed by one or more other functional components of eNodeB 120.

Figure 5:
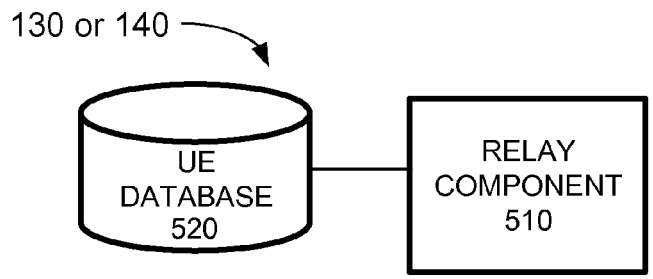
FIG. 5 is a diagram illustrating an example of functional components of a network node device according to an implementation described herein.

FIG. 5 is a diagram illustrating example functional components of MME device 130 or of to SGW 140. As shown in FIG. 5, MME device 130 or SGW 140 may include a relay component 510 and a UE database 520.

Relay component 510 may receive a packet from eNodeB 120, which were relayed from another eNodeB that experienced a backhaul link failure, may determine that the received packet includes a UE packet, and may retrieve the UE packet from the received relay packet. Relay component 510 may receive a packet destined for a particular UE, may determine that the particular UE is reachable through a particular eNodeB that experienced a backhaul failure by accessing UE database 520, may encapsulate the packet in a relay packet, and may transmit the relay packet to a neighboring eNodeB, determined by accessing UE database 520, through which the particular eNodeB may be reached.

UE database 520 may store information associating a particular UE with a particular eNodeB. For example, UE database 520 may identify the particular UE as a UE that is associated with a particular eNodeB that has experienced a backhaul link failure, may associate the UE with the particular eNodeB, and may associate the UE with a neighboring eNodeB, through which the particular eNodeB may be reached.

Although FIG. 5 shows example functional components of MME device 130 or SGW 140, in other implementations, MME device 130 or SGW 140 may include fewer functional components, different functional components, differently arranged functional components, or additional functional components than depicted in FIG. 5. Additionally or alternatively, one or more functional components of MME device 130 or SGW 140 may perform one or more other tasks described as being performed by one or more other functional components of MME device 130 or SGW 140. Furthermore, while FIG. 5 has been described as representing eNodeB MME device 130 or SGW 140, FIG. 5 may represent another element of EPC network 101 that communicates with eNodeB 120.

Figure 6A:
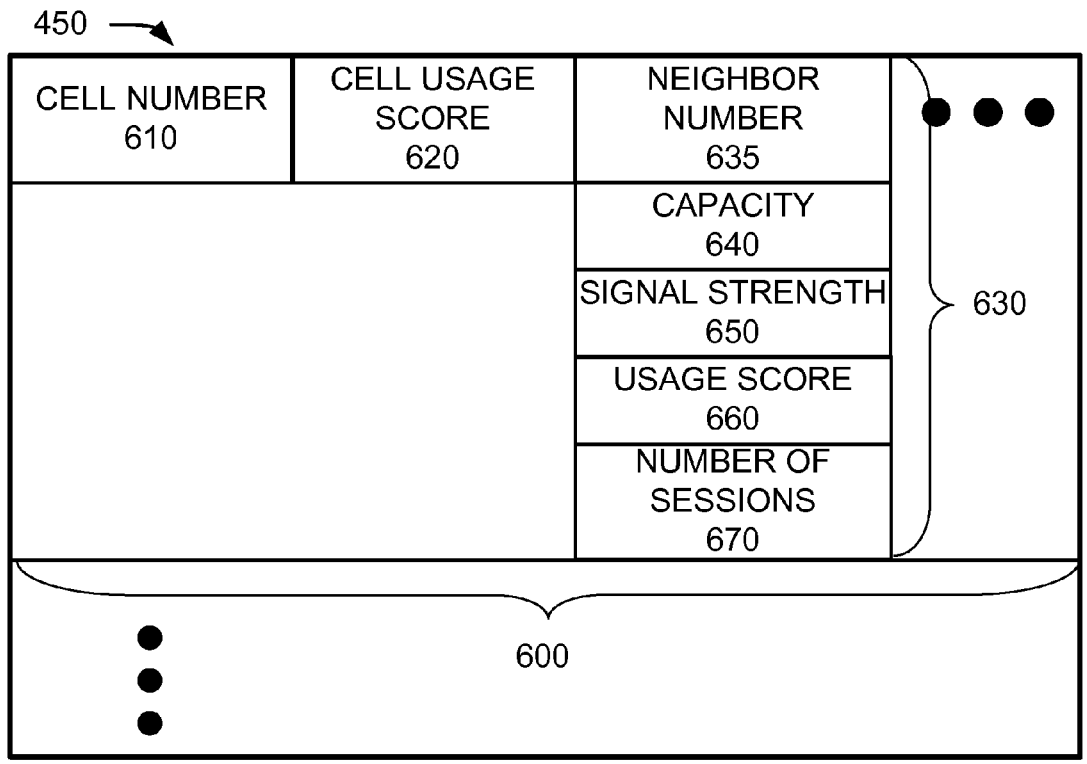
FIG. 6A is a diagram of example fields that may be stored within a neighbor table according to an implementation described herein.

FIG. 6A is a diagram of example fields that may be stored within neighbor table 450 according to an implementation described herein. In one implementation, neighbor table 450 may be implemented in a storage device included as part of memory 330 of eNodeB computer system 210. In another implementation, neighbor table 450 may be stored in a memory associated with another device or a group of devices, separate from or including memory 330 of eNodeB computer system 210. As shown in FIG. 6A, neighbor table 450 may store cell records 600 associated with particular cells of eNodeB 120. Cell record 600 may include a cell number field 610, a cell usage score field 620, and one or more neighbor fields 630.

Cell number field 610 may identify a particular cell of eNodeB 120. Cell usage score field 620 may store a cell usage score indicating usage conditions associated with the particular cell. Cell usage score may be computed by neighbor selector 420 based on cell usage conditions received from usage monitor 486. For example, the cell usage score may be based substantially on the amount of bandwidth being used by UE signals, as reported most recently by usage monitor 486, or based on an average computed over a particular time period.

Cell record 600 may store a neighbor field 630 for each neighboring eNodeB 120 that is associated with the cell identified by cell number field 610. Neighbor field 630 may include a neighbor number field 635, a capacity field 640, a signal strength field 650, a usage score 660, and a number of sessions field 670.

Neighbor number field 635 may identify a particular neighboring eNodeB of the particular cell. Neighbor number field 635 may further include information that may be used to identify the neighboring eNodeB in EPC network 101, such as, for example, an IP address associated with the neighboring eNodeB.

Capacity field 640 may store information about a capacity associated with the neighboring eNodeB. For example, the information may include a total bandwidth of the neighboring eNodeB and/or a total number of UE sessions that the neighboring eNodeB may be able to handle.

Signal strength field 650 may store information about the strength of signals exchanged between the particular eNodeB and the neighboring eNodeB. The signal strength may be measured, for example, by neighbor interface component 488 when receiving a signal from the neighboring eNodeB. As another example, the signal strength of a signal sent from the particular eNodeB to the neighboring eNodeB may be provided in a reporting packet received from the neighboring eNodeB in response to a discovery packet sent to the neighboring eNodeB by the particular eNodeB.

Usage score field 660 may store a usage score indicating usage conditions associated with the neighboring eNodeB. The usage score may be received in a reporting packet received from the neighboring eNodeB, or may be computed based on information received in a reporting packet received from the neighboring eNodeB. For example, the usage score may be based substantially on the amount of bandwidth being used by UE signals in the neighboring eNodeB, as received most recently in a reporting packet, or based on an average computed over a particular time period based on information received in reporting packets from the neighboring eNodeB.

Number of sessions field 670 may store information about a number of active UE sessions associated with the neighboring eNodeB. A number of active UE sessions may be received in a reporting packet received from the neighboring eNodeB.

Although FIG. 6A shows example fields of cell table 450, in other implementations, cell table 450 may contain fewer fields, different fields, additional fields, or differently arranged fields than depicted in FIG. 6A. Additionally or alternatively, one or more fields of cell table 450 may include information described as being included in one or more other fields of cell table 450.

Figure 6B:
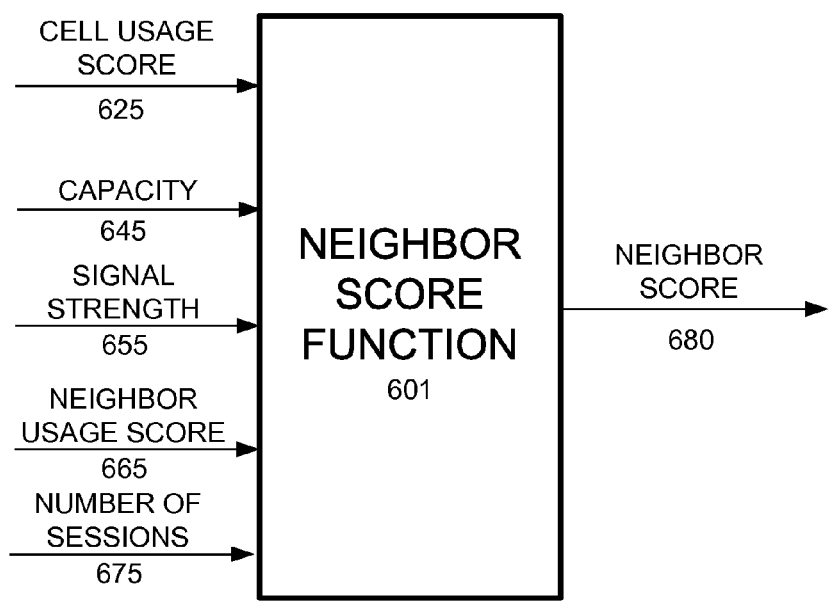
FIG. 6B is a diagram of an example of a neighbor score function according to an example implementation.

FIG. 6B is a diagram of an example neighbor score function 601 that may be implemented by neighbor selector 420 according to an example implementation. Neighbor score function 601 may, for a particular neighboring eNodeB, take, as input values, one or more of the depicted parameters and generate a neighbor score 680. Neighbor score 680 may be used by traffic manager 430 to determine how much traffic to relay to the particular neighboring eNodeB.

Neighbor score function 601 may include a cell usage score input 625. Cell usage score input 625 may be based on information about the usage conditions associated with the cell in which the neighboring eNodeB is located, such as information stored in cell usage score field 620. A high cell usage score may reduce neighbor score 680. Providing an input based on usage conditions of the cell may be used to influence neighbor score 680 so that a neighboring eNodeB located in a cell experiencing heavy usage (e.g., a large portion of available bandwidth being used by UEs), is less likely to be selected by neighbor selector 420. Thus, as a result, neighbor selector 420 may be more likely to select a neighboring eNodeB in a cell with more available bandwidth for relaying UE signals.

Neighbor score function 601 may include a capacity input 645. Capacity input 645 may be based on information about the capacity of the neighboring eNodeB, such as information stored in capacity field 640. A high capacity may increase neighbor score 680. Providing an input based on capacity may be used to influence neighbor score 680 so that a neighboring eNodeB with a high capacity may be more likely to be selected by neighbor selector 420, as a neighboring eNodeB with a higher capacity may be more likely to be able to handle the extra traffic of relayed UE signals.

Neighbor score function 601 may include a signal strength input 655. Signal strength input 655 may be based on information about the strength of signals exchanged between the neighboring eNodeB and a particular eNodeB relaying signals to the neighboring eNodeB, such as information stored in signal strength field 650. A high signal strength may increase neighbor score 680. Providing an input based on signal strength may be used to influence neighbor score 680 so that a neighboring eNodeB associated with a high signal strength may be more likely to be selected by neighbor selector 420, as a neighboring eNodeB associated with a high signal strength may be more likely to receive relayed UE signal with a low error rate.

Neighbor score function 601 may include a neighbor usage score input 665. Neighbor usage score input 665 may be based on information about the usage conditions associated with the neighboring eNodeB, such as information stored in usage score field 660. A high usage score may reduce neighbor score 680. Providing an input based on usage conditions of the neighboring eNodeB may be used to influence neighbor score 680 so that a neighboring eNodeB experiencing heavy usage (e.g., a large portion of available bandwidth being used by UEs), is less likely to be selected by neighbor selector 420. Thus, as a result, neighbor selector 420 may be more likely to select a neighboring eNodeB with more available bandwidth for relaying UE signals.

Neighbor score function 601 may include a number of sessions input 675. Number of sessions input 675 may be based on information about the number of active UE sessions associated with the neighboring eNodeB, such as information stored in number of sessions field 670. A high number of sessions may reduce neighbor score 680. Providing an input based on number of sessions associated with the neighboring eNodeB may be used to influence neighbor score 680 so that a neighboring eNodeB associated with a high number of active UE sessions is less likely to be selected by neighbor selector 420. Thus, as a result, neighbor selector 420 may be more likely to select a neighboring eNodeB with fewer number of active UE sessions.

One or more of the inputs of neighbor score function 601 may be combined to generate neighbor score 680 for a particular neighboring eNodeB. In one implementation, inputs of neighbor score function 601 may be combined as a weighted sum. In other words, each of the inputs of neighbor score function 601 may be multiplied by a weight and the results may be added to generate neighbor score 680. For example, cell usage score input 625 may be given a greater weight than the other inputs, and thus neighbor score 680 may depend most significantly on cell usage score input 625. As another example, signal strength input 655 may be given more weight than neighbor usage score input 665, as signal strength may be more significant than how busy a particular neighboring eNodeB is, since a weak signal may mean that the neighboring eNodeB may not pick up the relayed signals. In another implementation, number of sessions input 675 may not influence neighbor score 680 unless the number of sessions is greater than a particular threshold. For example, a neighboring eNodeB may have a maximum number of sessions, and a threshold may be set near the maximum number of sessions to avoid overloading the neighboring eNodeB.

Although FIG. 6B shows exemplary inputs of neighbor score function 601, in other implementations, neighbor score function 601 may contain fewer inputs, different inputs, or additional inputs, than depicted in FIG. 6B. Additionally or alternatively, one or more inputs of neighbor score function 601 may include information described as being included in one or more other inputs of neighbor score function 601.

Figure 7:
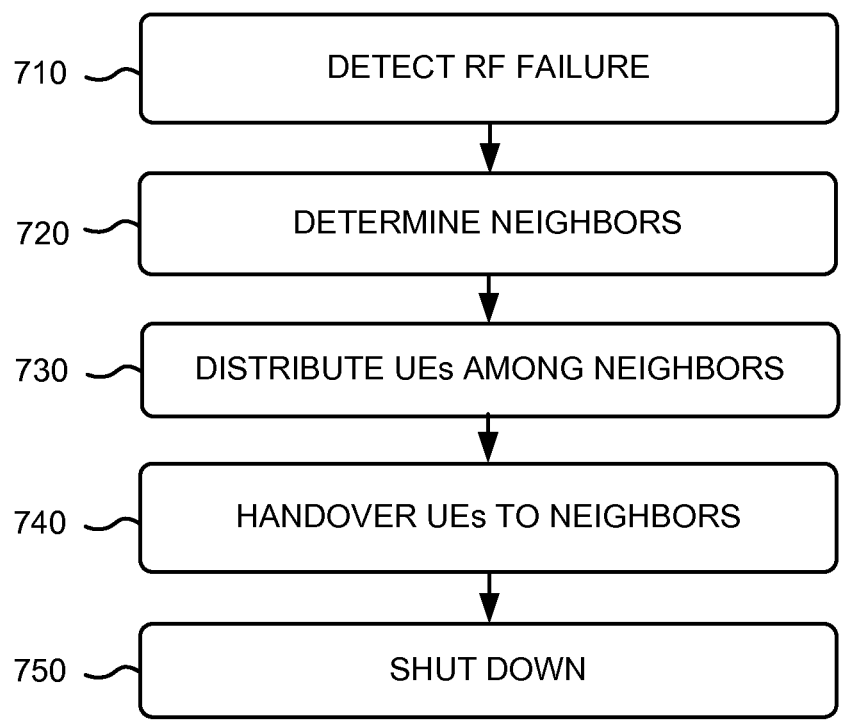
FIG. 7 is a flow diagram illustrating a first process for responding to an eNodeB failure according to an implementation described herein.

FIG. 7 is a flow diagram illustrating a process for responding to an eNodeB RF failure according to an implementation described herein. In one implementation, the process of FIG. 7 may be performed by eNodeB 120. In other implementations, some or all of the process of FIG. 7 may be performed by another device or a group of devices separate from or including eNodeB 120.

The process of FIG. 7 may include detecting an RF failure (block 710). For example, RF performance monitor 482 may monitor the performance of RF transceivers 220, may detect if a malfunction occurs in one of RF transceivers 220, or if an error rate experienced by one RF transceivers 220 becomes greater than an error threshold, and may inform processing component 410 of the detected malfunction. An RF failure may be associated with eNodeB 120 as a whole or with a particular cell of eNodeB 120. For example, only one RF transceiver 220 of eNodeB 120 may malfunction, and the process of FIG. 7 may only apply to a particular cell associated with the malfunctioning RF transceiver 220. As another example, an RF failure may be associated with processing circuitry associated with eNodeB computer system 210, and the process of FIG. 7 may apply to all cells of eNodeB 120.

Neighbors may be determined (block 720). For example, neighbor interface component 488 may identify one or more neighboring eNodeBs for each cell of eNodeB 120, and neighbor selector 420 may compute a neighbor score for the identified neighboring eNodeBs. UEs may be distributed among neighbors (block 730). For example, traffic manager 430 may distribute EUs, currently being served by eNodeB, to the identified neighboring eNodeBs. When calculating neighbor scores to select neighboring eNodeBs in response to an RF failure, neighbor selector 420 may not need to take cell usage scores, associated with the cells of the eNodeB that experienced the RF failure, into account. In one implementation, when selecting neighboring eNodeBs in response to an RF failure, preference may be given to signal strength as a factor. In another implementation, signal strength may not be given preference over other neighboring eNodeB parameters.

In one implementation, a single neighboring eNodeB may be selected and UEs being served by the eNodeB, which experienced an RF failure, may be handed over to the single selected neighboring eNodeB. In another implementation, multiple neighboring eNodeBs may be selected. For example, in one implementation, a neighboring eNodeB with the highest neighbor score may be selected for each cell of eNodeB 120 and UEs associated with a particular cell may be handed over to the selected neighboring eNodeB associated with the particular cell. In another implementation, multiple neighboring eNodeB may be selected for a particular cell, and UEs associated with the particular cell may be distributed among the multiple neighboring eNodeBs.

UEs may be handed over to neighbors (block 740). For example, eNodeB 120 may send a handover request via an X2 interface to a selected neighboring eNodeB, using backhaul interface component 470, may receive a handover acknowledgement request from the selected neighboring eNodeB, and may forward data associated with UEs to the neighboring eNodeB (e.g., GUTIs associated with the UEs being handed over and/or buffered packets being sent from or to the UEs being handed over).

Shut down may be performed (block 750). As an eNodeB without a functioning RF transceiver may not be able to service UEs, eNodeB 120 may shutdown until repairs can be performed. eNodeB 120 may inform MME device 130 that eNodeB 120 is about to shutdown. If eNodeB 120 is unable to shutdown, eNodeB 120 may inform MME device 130 of the RF failure, and MME device 130 may blacklist eNodeB 120, indicating that eNodeB 120 is unavailable in EPC network 101.

Figure 8:
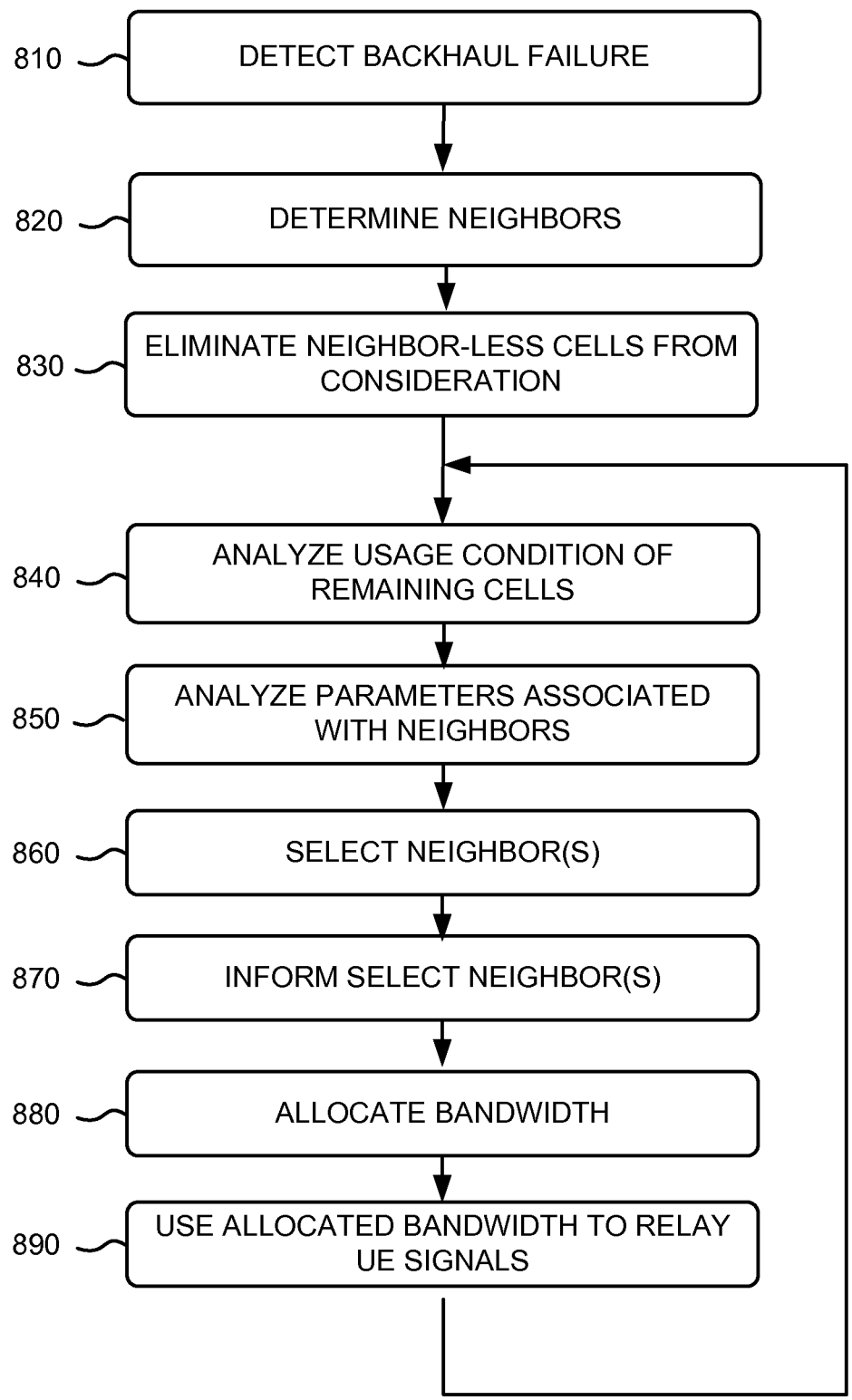
FIG. 8 is a flow diagram illustrating a second process for responding to an eNodeB failure according to an implementation described herein.

FIG. 8 is a flow diagram illustrating a second process for responding to an eNodeB backhaul failure according to an implementation described herein. In one implementation, the process of FIG. 6 may be performed by eNodeB 120. In other implementations, some or all of the process of FIG. 6 may be performed by another device or a group of devices separate from or including eNodeB 120.

The process of FIG. 8 may include detecting a backhaul failure (block 810). For example, heartbeat component 475 of backhaul interface component 470 may not receive a heartbeat message from MME device 130 or from SGW 140 for a particular length of time. As another example, heartbeat component 475 of backhaul interface component 470 may determine that an error rate associated with backhaul link 121 is higher than a threshold and may determine that backhaul link 121 is to be considered as malfunctioning.

Neighbors may be determined (block 820). For example, neighbor interface component 488 may identify one or more neighboring eNodeBs for each cell of eNodeB 120. Neighbors may be determined before a backhaul failure is detected. For example, neighboring eNodeBs may be determined when eNodeB 120 is configured, or when a new neighboring eNodeB is added. If neighbors are determined before a backhaul failure is detected, information about neighboring eNodeBs need not be received wirelessly via wireless signal 116, but may be received over backhaul link 121 (e.g., from the neighboring eNodeB via an X2 interface, or from MME device 130). Alternatively or additionally, neighbors may be determined by neighbor interface component 488 in response to detecting a backhaul failure.

Neighbor-less cells may be eliminated from consideration (block 830). When selecting one or more neighboring eNodeBs, cells which do not include a neighboring eNodeB may be removed from consideration, since if a particular cell does not include a neighboring eNodeB, it may not be possible to use the particular cell for relaying UE signals.

Usage conditions of the remaining cells may be analyzed (block 840). For example, usage monitor 486 may provide usage statistics associated with a particular cell of eNodeB 120 to neighbor selector 420. For example, usage monitor 486 may measure the amount of UE traffic being handled by the particular cell, such as the number of active UE sessions, the amount of bandwidth being used by UE signals in relation to the total amount of available bandwidth, an average bit rate associated with UE signals, a noise level associated with UE signals, and/or an error rate associated with UE signal. The usage conditions may be reported as instantaneous values at particular intervals. Additionally or alternatively, the usage conditions may be reported as computed average values over particular intervals.

Parameters associated with neighbors may be analyzed (block 850). For example, neighbor interface component 488 may receive information associated with parameters associated with neighboring eNodeBs in reporting packets received from the neighboring eNodeBs, which may be stored in cell table 450. The parameters may include, for example, a capacity associated with a neighboring eNodeB, a signal strength associated with the neighboring eNodeB, a usage score associated with the neighboring eNodeB, and/or a number of sessions associated with the neighboring eNodeB. Neighbor selector 420 may execute neighbor score function 601 to calculate neighbor score 680 associated with the neighboring eNodeB.

One or more neighbors may be selected (block 860). For example, neighbor selector 420 may select one or more neighboring eNodeBs, to which UE signals will be relayed, based on neighbor scores associated with particular neighboring eNodeBs. In one implementation, a single neighboring eNodeB may be selected. For example, a neighboring eNodeB with the highest neighbor score may be selected, and all UE signals may be relayed using the particular cell in which the selected neighboring eNodeB is selected. In another implementation, a neighboring eNodeB with the highest neighbor score in a particular cell may be selected for each cell of eNodeB 120 that includes a neighboring eNodeB, and UE signals may distributed among the cells that include a neighboring eNodeB. In yet another implementation, a neighboring eNodeB with the highest neighbor score in a particular cell may be selected for each cell of eNodeB 120 that includes a neighboring eNodeB, if the neighbor score is higher than a particular threshold, and UE signals may distributed among the cells that include a neighboring eNodeB associated with a neighbor score higher than the particular threshold.

In yet another implementation, more than one neighboring eNodeB may be selected per cell. For example, a neighboring eNodeB may be selected if the neighbor score of the neighboring eNodeB is higher than a neighbor score threshold. If more than one neighboring eNodeB is selected per cell, RF transceiver 220 of a particular cell may not be able to determine which of the selected neighboring eNodeBs will receive the relayed UE signals. Therefore, relay component 440 may encapsulate relayed UE signals into relay packets, and may include a neighboring eNodeB identifier in a particular relay packet. Thus, if a particular neighboring eNodeB receives a relay packet that includes an eNodeB identifier not associated with the particular neighboring eNodeB, the particular neighboring eNodeB may reject the relay packet. This may allow traffic manager 430, in conjunction with relay component 440, to distribute relayed UE traffic to multiple neighboring eNodeBs per cell.

The selected neighboring eNodeBs may be informed to expect relay traffic (block 870). For example, if a particular cell includes more than one neighboring eNodeB, and if RF transceiver 220 of the particular cell transmits relayed UE signals, more than one eNodeB may receive the signals. Relay component 440 may assign an eNodeB identifier to particular selected neighboring eNodeBs and may inform the particular selected neighboring eNodeBs to accept relay packets that include the assigned eNodeB identifier.

Bandwidth may be allocated (block 880) and the allocated bandwidth may be used to relay UE signals (block 890). For example, traffic manager 430 may allocate bandwidth, from the available bandwidth, for each cell which includes a neighboring eNodeB that was selected to receive relayed UE signals. If neighboring eNodeBs were selected for more than one cell of eNodeB 120, traffic manager 430 may distribute relayed UE signals among the cells that include the selected neighboring eNodeBs based on neighbor scores of the neighboring eNodeBs. For example, assume cell 201 includes a first neighboring eNodeB, which was selected and is associated with a first neighbor score, and cell 202 includes a second neighboring eNodeB, which was selected and is associated with a second neighbor score, and assume the first neighbor score is higher than the second neighbor score. Traffic manager 430 may distribute UE traffic that is to be relayed in such a manner that cell 201 relays more UE traffic than cell 202.

Blocks 840 through 880 may be repeated at particular intervals. For example, while backhaul link 121 is down, neighbor selector 420 may periodically re-calculate neighbor scores associated with neighboring eNodeBs, and traffic manager 430 may periodically re-distribute relayed UE traffic among neighboring eNodeBs. For example, if a neighboring eNodeB experiences a surge in UE traffic, a reporting packet may be received from the neighboring eNodeB indicating the increase in UE traffic. In response, the neighbor score associated with the neighboring eNodeB may be recalculated and relay traffic may be diverted from the neighboring eNodeB to another neighboring eNodeB.

Figure 9A:
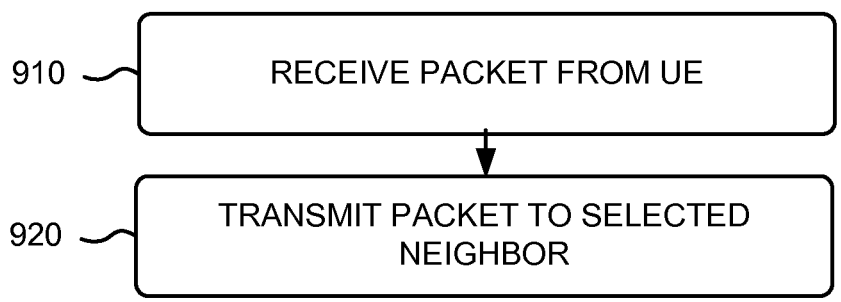
FIG. 9A is a flow diagram illustrating a first process for transmitting a packet according to an implementation described herein.

FIG. 9A is a flow diagram illustrating a first process for transmitting a packet according to an implementation described herein. In the process of FIG. 9A, a packet from a UE may be relayed to a neighboring eNodeB without encapsulation. Thus, the neighboring eNodeB may receive the packet as if it was received directly from the UE. The process of FIG. 9A may be implemented if a cell of eNodeB 120 does not include multiple neighboring eNodeBs. In one implementation, the process of FIG. 9A may be performed by eNodeB 120. In other implementations, some or all of the process of FIG. 9A may be performed by another device or a group of devices separate from or including eNodeB 120.

The process of FIG. 9A may include receiving a packet from a UE (block 910). For example, UE interface component 484 may receive a UE packet via a particular RF transceiver 220. The UE packet may be transmitted to a selected neighbor (block 920). For example, neighbor interface component 488 may re-transmit the received UE packet via a particular RF transceiver 220 associated with a cell that includes a selected neighboring eNodeB.

Figure 9B:
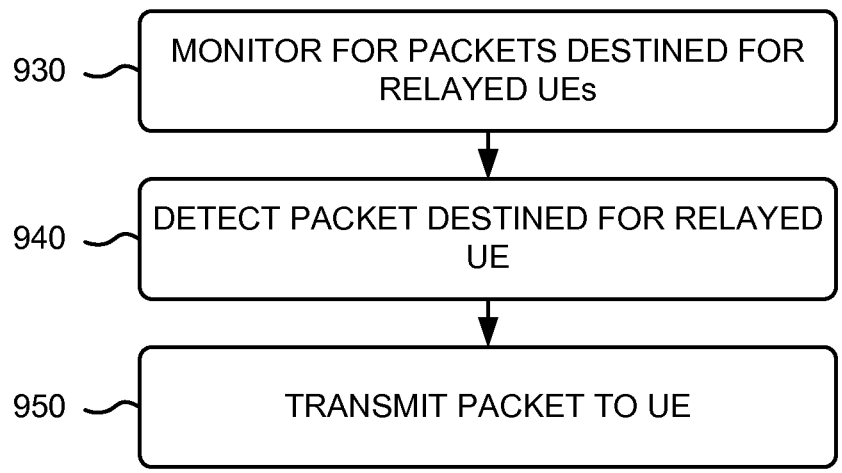
FIG. 9B is a flow diagram illustrating a first process for receiving a packet according to an implementation described herein.

FIG. 9B is a flow diagram illustrating a first process for receiving a packet according to an implementation described herein. In the process of FIG. 9B, the particular eNodeB that experienced a backhaul failure monitors for packets destined for UEs served by the particular eNodeB. Thus, the neighboring eNodeB, to which packets from UEs are being relayed by the eNodeB with the backhaul failure, transmits packets to UEs as if the UEs were within the neighboring eNodeB's service area. In one implementation, the process of FIG. 9B may be performed by eNodeB 120. In other implementations, some or all of the process of FIG. 9B may be performed by another device or a group of devices separate from or including eNodeB 120.

The process of FIG. 9B may include monitoring for packets destined for relayed UEs (block 930). For example, neighbor interface component 488 may monitor for packets from a neighboring eNodeB. A packet destined for a relayed UE may be detected (block 940). For example, neighbor interface component 488 may receive a UE packet via an RF transceiver 220 associated with a cell that includes a selected neighboring eNodeB. The packet may be transmitted to the UE (block 950). For example, UE interface component 484 may re-transmit the received packet to a UE associated with the received packet via a particular RF transceiver associated with a cell in which the UE is located.

Figure 10A:
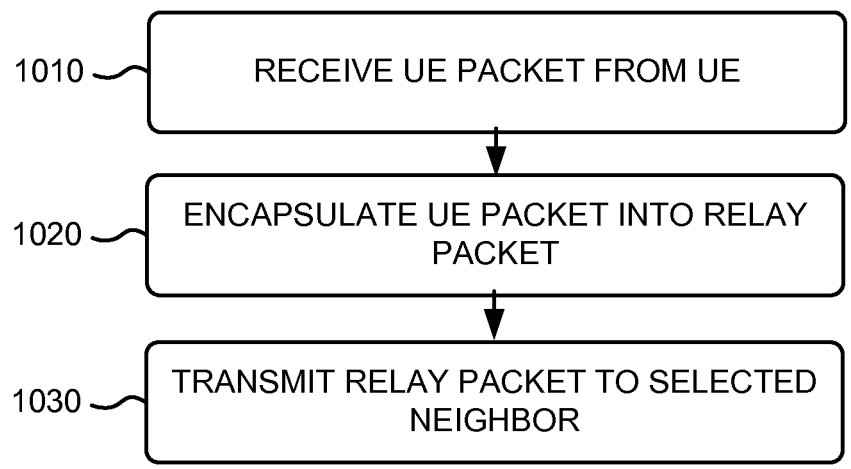
FIG. 10A is a flow diagram illustrating a second process for transmitting a packet according to an implementation described herein.

FIG. 10A is a flow diagram illustrating a second process for transmitting a packet according to an implementation described herein. In the process of FIG. 10A, a packet from a UE may be encapsulated before being relayed to a neighboring eNodeB. Thus, the neighboring eNodeB may receive the encapsulated packet as a UE packet from a particular eNodeB, which has experienced a backhaul failure, causing the neighboring eNodeB to perceive the particular eNodeB as a UE. Thus, all packets received by the neighboring eNodeB from the particular eNodeB may be perceived as coming from a same UE, even though the received packets may include, encapsulated within, packets from different UEs served by the particular eNodeB.

Encapsulating UE packets into relay packets may prevent multiple neighboring eNodeBs from receiving a UE packet and forwarding the UE packet to MME device 130 or to SGW 140. Encapsulating UE packets into relay packets may allow eNodeB 120 to select more than one neighbor per cell to receive relayed UE packets, as a relay packet may include an eNodeB identifier, which may allow a first eNodeB to receive a relay packet and a second eNodeB to reject the relay packet. In one implementation, the process of FIG. 10A may be performed by eNodeB 120. In other implementations, some or all of the process of FIG. 10A may be performed by another device or a group of devices separate from or including eNodeB 120.

The process of FIG. 10A may include receiving a UE packet from a UE (block 1010). For example, UE interface component 484 may receive a UE packet via a particular RF transceiver 220. The UE packet may be encapsulated into a relay packet (block 1020). For example, relay component 440 may encapsulate the UE packet into a relay packet. The relay packet may include an identifier that identifies eNodeB 120 as a UE to MME device 130 and/or to SGW 140. For example, the relay packet may include a GUTI assigned to eNodeB 120 by MME device 130 when eNodeB 120 registered with MME device 130 as a UE (see FIG. 11A below). As another example, the relay packet may include an eNodeB identifier that identifies a particular neighboring eNodeB which is to receive the relay packet and forward the relay packet to MME 130 or to SGW 140.

The relay packet may be transmitted to a selected neighbor (block 1030). For example, neighbor interface component 488 may transmit the relay packet via a particular RF transceiver 220 associated with a cell that includes a selected neighboring eNodeB that is to receive the relay packet.

Figure 10B:
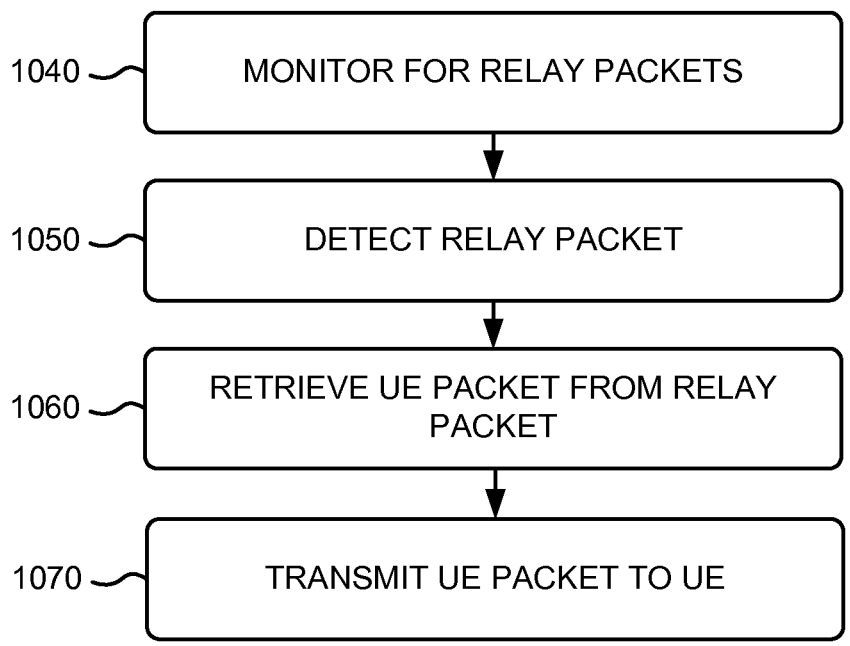
FIG. 10B is a flow diagram illustrating a second process for receiving a packet according to an implementation described herein.

FIG. 10B is a flow diagram illustrating a second process for receiving a packet according to an implementation described herein. In the process of FIG. 10B, the particular eNodeB that experienced a backhaul failure monitors for relay packets sent from a neighboring eNodeB. Thus, the neighboring eNodeB, to which packets from UEs are being relayed by the eNodeB with the backhaul failure, transmits packets to the particular eNodeB as if the particular eNodeB were a UE served by the neighboring eNodeB. In one implementation, the process of FIG. 10B may be performed by eNodeB 120. In other implementations, some or all of the process of FIG. 10B may be performed by another device or a group of devices separate from or including eNodeB 120.

The process of FIG. 10B may include monitoring for relay packets (block 1040). For example, neighbor interface component 488 may monitor for packets from a neighboring eNodeB. A relay packet may be detected (block 1050). For example, neighbor interface component 488 may receive a relay packet via an RF transceiver 220 associated with a cell that includes a selected neighboring eNodeB, and forward the relay packet to relay component 440.

A UE packet may be retrieved from the relay packet (block 1060). For example, relay component 440 may retrieve a UE packet from the relay packet. The UE packet may be transmitted to a UE (block 1070). For example, UE interface component 484 may transmit the received packet to a UE associated with the retrieved UE packet via a particular RF transceiver associated with a cell in which the UE is located.

Figure 11A:
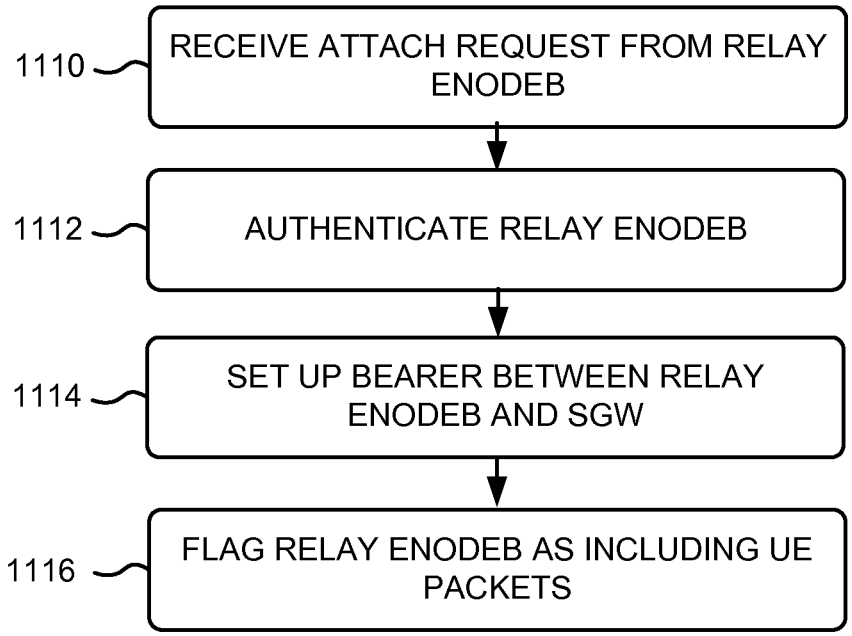
FIG. 11A is a flow diagram illustrating a process of registering a relay node according to an implementation described herein.

FIG. 11A is a flow diagram illustrating a process of registering a relay eNodeB as a UE according to an implementation described herein. Thus, in the process of FIG. 11A, a particular eNodeB, which has experienced a backhaul failure, registers with MME device 130, via a neighboring eNodeB, as if the particular eNodeB were a UE. In one implementation, the process of FIG. 11A may be performed by MME device 130. In other implementations, some or all of the process of FIG. 11A may be performed by another device or a group of devices separate from or including MME device 130.

The process of FIG. 11A may include receiving an attach request from a relay eNodeB (block 1110). For example, eNodeB 120 may detect a backhaul link failure and may send an attach request, via a neighboring eNodeB, requesting to attach to MME device 130 as a UE. The request may include an area identifier that associates the neighboring eNodeB with eNodeB, such as a tracking area code (TAC).

The relay eNodeB may be authenticated (block 1112). For example, MME device 130 may assign a GUTI to eNodeB 120 and may request authentication information from eNodeB 120. eNodeB 120 may respond by providing an identification code to MME device 130. A bearer may be set up between the relay eNodeB and an SGW (block 1114). For example, MME device 130 may inform SGW 140 of the new UE and may instruct SGW 140 to reserve resources for a default bearer between the relaying eNodeB and SGW 140. The default bearer may have a higher QoS requirement that a standard default bearer set up for a UE, as the bearer may carry traffic for many UEs served by eNodeB 120.

The relaying eNodeB may be flagged as including UE packets (block 1116). For example, MME device 130 may flag the GUTI associated with eNodeB 120 as representing a relaying eNodeB. Thus, when a relay packet is received from eNodeB 120 via a neighboring eNodeB, MME device 130 may detect that the relay packet includes a UE packet associated with a UE being served by eNodeB 120. MME device 130 may identify UEs served by eNodeB 120 and store, in UE database 520, indications that UEs served by eNodeB 120 are associated with the GUTI assigned to eNodeB 120 and should be incorporated into a relay packet before being sent to the neighboring eNodeB. For example, UEs associated with eNodeB 120 may be identified based on a tracking area code (TAC) associated with the UEs. As another example, UEs associated with eNodeB 120 may be identified based on a GUTI included in a UE packet that was retrieved from a relay packet received from eNodeB 120. MME device 130 may provide information identifying the UEs associated with eNodeB 120 to SGW 140.

Figure 11B:
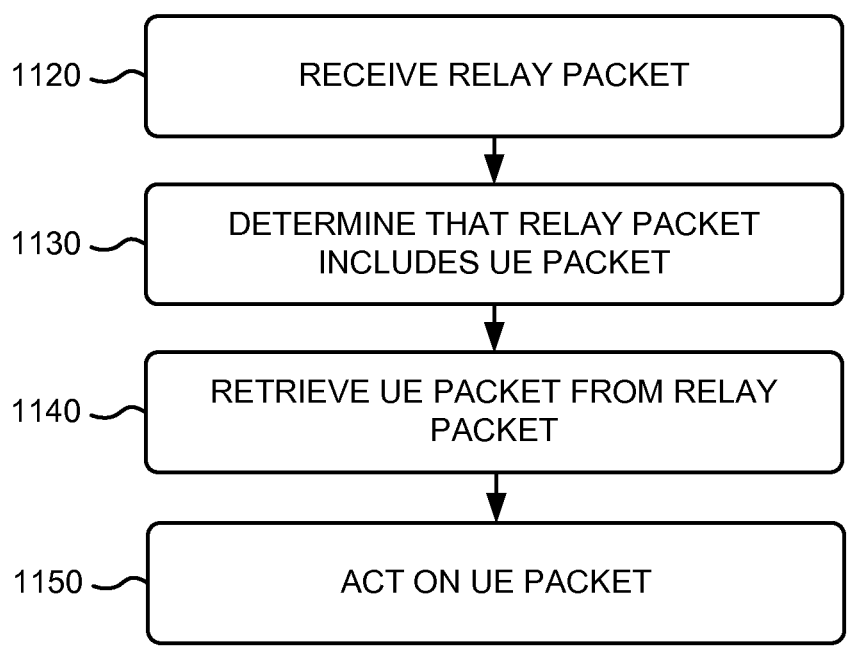
FIG. 11B is a flow diagram illustrating a process for receiving a packet by a network node according to an implementation described herein.

FIG. 11B is a flow diagram illustrating a process for receiving a packet by a network node according to an implementation described herein. In the process of FIG. 11B, MME device 130 or SGW 140 may receive a relay packet, originating from an eNodeB that experienced a backhaul failure, via a neighboring eNodeB. The neighboring eNodeB may forward the relay packet as a UE packet. MME device 130, or SGW 140, may receive the relay packet as a UE packet, and may subsequently determine that the relay packet includes a UE packet from a particular UE, and may retrieve the UE packet from the relay packet. In one implementation, the process of FIG. 11B may be performed by MME device 130 and/or by SGW 140. In other implementations, some or all of the process of FIG. 11B may be performed by another device or a group of devices separate from or including MME device 130 and/or SGW 140.

The process of FIG. 11B may include receiving a relay packet (block 1120). For example, relay component 510 of MME device 130, or of SGW 140, may receive a relay packet from eNodeB 120 via a neighboring eNodeB.

A determination may be made that the relay packet includes a UE packet (block 1130). For example, relay component 510 of MME device 130, or of SGW 140, may determine, based on an identifier included in the relay packet, that the relay packet is associated with eNodeB 120, which has lost a backhaul link and is relaying UE packets via a neighboring eNodeB. For example, relay component 510 may identify a GUTI, included in the relay packet, as being associated with eNodeB 120, by accessing UE database 520.

The UE packet may be retrieved from the relay packet (block 1140). For example, relay component 510 of MME device 130, or of SGW 140, may retrieve a UE packet from the relay packet in response to determining that the relay packet includes a UE packet. The UE packet may be acted upon (block 1150). For example, if the UE packet is a control packet received by MME device 130, MME device 130 may perform a control plane operation associated with the UE packet. If the UE packet is a data plane packet received by SGW 140, SGW 140 may forward the UE packet to PGW 150.

Figure 11C:
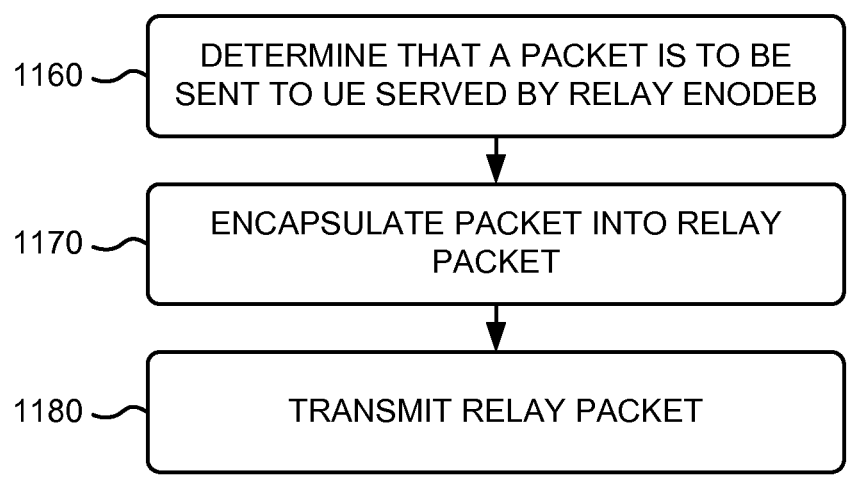
FIG. 11C is a flow diagram illustrating a process for transmitting a packet by a network node according to an implementation described herein.

FIG. 11C is a flow diagram illustrating a process for transmitting a packet by a network node according to an implementation described herein. In the process of FIG. 11C, MME device 130 or SGW 140 may need to transmit a packet to a UE served by a particular eNodeB that has experienced a backhaul failure. The particular eNodeB may have registered with MME device 130 as a UE, via a neighboring eNodeB. In one implementation, the process of FIG. 11C may be performed by MME device 130 and/or by SGW 140. In other implementations, some or all of the process of FIG. 11C may be performed by another device or a group of devices separate from or including MME device 130 and/or SGW 140.

The process of FIG. 11C may include determining that a packet needs to be sent to a UE that is served by a relay eNodeB (block 1160). For example, relay component 510 of MME device 130, or of SGW 140, may determine that a UE packet is destined for a UE that is associated with eNodeB 120, which has lost a backhaul link and is in communication with MME device 130 and/or SGW 140 via a neighboring eNodeB, by accessing UE database 520.

The packet may be encapsulated into a relay packet (block 1170). For example, relay component 510 of MME device 130, or of SGW 140, may encapsulate the UE packet into a relay packet. The relay packet may include an identifier that associates the relay packet with eNodeB 120, which has lost a backhaul link and is in communication with MME device 130 and/or SGW 140 via a neighboring eNodeB. For example, the relay packet may include a GUTI assigned to eNodeB 120 by MME 130 when eNodeB 120 registered with MME 130 as a UE.

The relay packet may be transmitted (block 1180). For example, MME 130, or SGW 140, may forward the relay packet to the neighboring eNodeB, which is serving eNodeB 120, and through which eNodeB 120 registered. The neighboring eNodeB may be identified, for example, by a TAC associated with eNodeB in MME 130 and/or SGW 140.

When eNodeB 120 experiences a backhaul failure and sends an attach request to MME device 130, the attach request may be sent via a particular neighboring eNodeB. For example, the attach request may be sent via a neighboring eNodeB with a highest neighbor score. MME device 130 may associate the neighboring eNodeB with eNodeB 120, and may forward packets to eNodeB 120 via the neighboring eNodeB.

Subsequently, when eNodeB 120 relays UE packets, eNodeB 120 may, in a particular implementation, use traffic manager 430 to distribute UE traffic over more than one neighboring eNodeB. For example, traffic manager 430 may distribute UE traffic via a first neighboring eNodeB associated with a first cell of eNodeB 120 and via a second neighboring eNodeB associated with a second cell of eNodeB 120. In one implementation, while eNodeB 120 may relay UE traffic using more than one neighboring eNodeB, MME 130 and SGW 140 may forward UE packets to eNodeB 120 via a single neighboring eNodeB (e.g., the neighboring eNodeB through which eNodeB 120 sent the attach request). In another implementation, MME 130 and SGW 140 may also relay UE traffic using more than one neighboring eNodeB. This may require a traffic manager to be implemented in MME 130 and/or SGW 140. For example, when MME 130 and/or SGW 140 receives a relay packet from eNodeB 120 via a particular neighboring eNodeB, the traffic manager in MME 130 and/or SGW 140 may add the particular neighboring eNodeB to a table that includes a list of neighboring eNodeBs through which eNodeB 120 may be reached. When MME 130 and/or SGW 140 needs to send a packet to a UE being served by eNodeB 120, the traffic manager in MME 130 and/or SGW 140 may select one of the neighboring eNodeBs from the table and forward a relay packet to the selected neighboring eNodeB.

Figure 12:
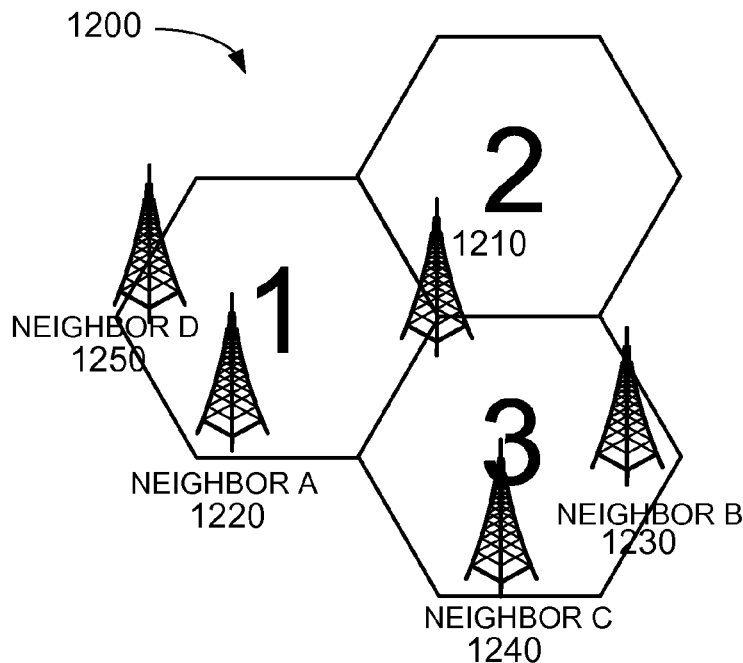
FIG. 12 is an example of a distribution of neighboring base stations according to an implementation described herein.

FIG. 12 illustrates an example neighbor eNodeB distribution 1200, which will be used to help illustrate an example of selecting neighbor eNodeBs, in response to a backhaul failure, and of distributing relay traffic onto the selected neighbors. Assume eNodeB 1210 includes cell #1, cell #2, and cell #3, and assume cell #1 includes neighbor A 1220, neighbor D 1250, cell #2 does not include any neighbors, and that cell #3 includes neighbor B 1230 and neighbor C 1240. When eNodeB 1210 loses a backhaul link, eNodeB 1210 may need to determine one or more neighbors through which to relay UE signals. eNodeB 1210 may invoke neighbor score function 601 to select one or more of the neighbors.

Since cell #2 does not include any neighbors, cell #2 may be removed from consideration. Assume a first implementation in which only one neighbor is selected. Assume neighbor D 1250 is associated with a low signal strength 655, causing neighbor D to have a lower neighbor score than any of the other neighbors. Assume that cell #1 is experiencing high usage conditions (e.g., a high amount of UE traffic). Therefore, any neighbors in cell #1 (e.g., neighbor A 1220) may be associated with a high cell usage score 625, leading to a low neighbor score. Further, assume that neighbor B 1230 may be experiencing high usage conditions, and thus neighbor usage score 665 associated with neighbor B 1230 may be high, leading to a low neighbor score. Thus, neighbor C 1230 may be selected, because neighbor C may be associated with a high signal strength, be located in a cell with low usage conditions, and be experiencing low usage conditions.

Now assume a second implementation in which more than one neighbor is selected. Assume neighbor selector 420 selects a neighbor if the neighbor score associated with the neighbor is above a particular selection threshold. Assume neighbor D 1250 is associated with a low signal strength 655, causing the neighbor score associated with neighbor D 1250 to be below the selection threshold. Thus, neighbor D 1250 may not be selected. Assume that neighbor scores associated neighbor A 1220, neighbor B 1230, and neighbor C 1240 are above the selection threshold, leading to neighbor A 1220, neighbor B 1230, and neighbor C 1240 to be selected.

Assume that cell #1 is experiencing high usage conditions (e.g., a high amount of UE traffic). Therefore, any neighbors in cell #1 (e.g., neighbor A 1220) may be associated with a high cell usage score 625, leading to a neighbor score of 5. Further, assume that neighbor B 1230 may be experiencing high usage conditions, and thus neighbor usage score 665 associated with neighbor B 1230 may be high, leading to a neighbor score of 20. Assume that neighbor C is associated with a high signal strength, is located in a cell with low usage conditions, and is experiencing low usage conditions, resulting in a neighbor score of 25. Traffic manager 430 may distribute UE signals to be relayed among the three selected neighbors based on the neighbor scores. For example, UE signals may be distributed based on a ration of a neighbor score to a total sum of neighbor scores. Thus, traffic manager 430 may distribute 10% of UE traffic to neighbor A 1220, 40% of UE traffic to neighbor B 1230, and 50% of UE traffic to neighbor C 1240.

In an implementation where one neighbor is selected per cell, if neighbor A 1220 is associated with a neighbor score of 5 and neighbor C 1240 is associated with a neighbor score of 25, traffic manager may distribute 17% of UE traffic to neighbor A and 83% of UE traffic to neighbor C. The neighbor scores of neighbors A, B, and C may be recalculated at a later time, if, for example, usage conditions associated with the neighbors or usage conditions associated with cells of eNodeB 120 change, and traffic manager 430 may redistribute UE traffic based on the recalculated UE scores.

Figure 13:
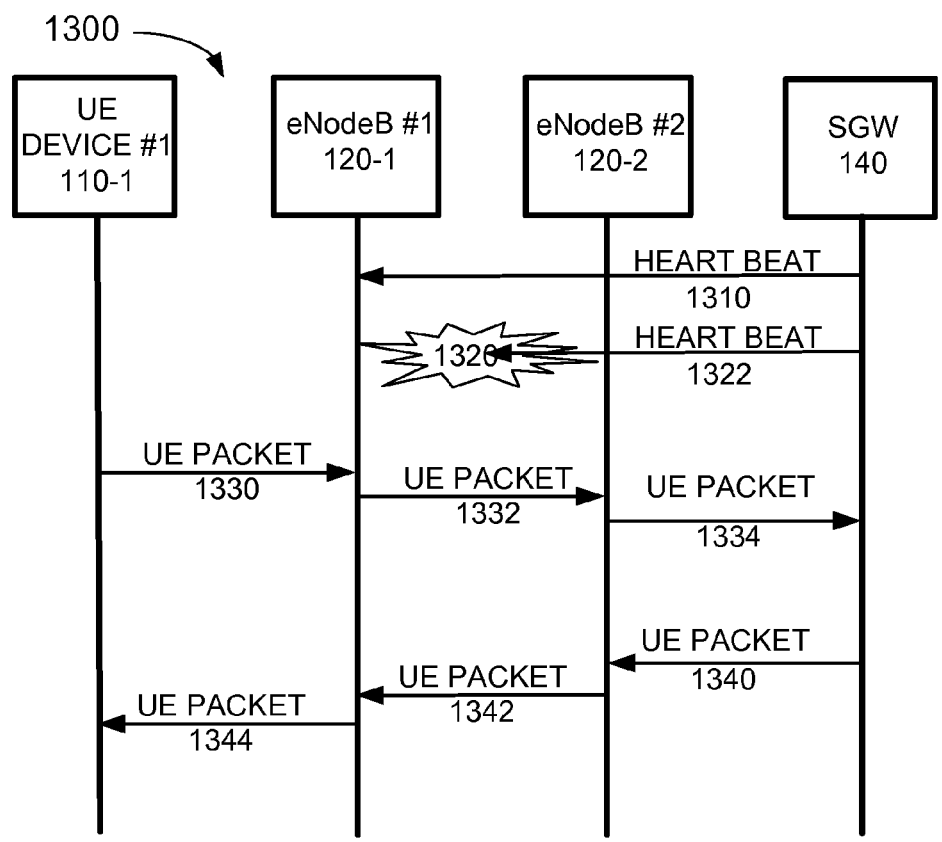
FIG. 13 is a diagram illustrating a first example of a signal flow according to an implementation described herein.

FIG. 13 is a first example of a signal flow according to an implementation described herein. In the example of FIG. 13, a packet from a UE may be relayed to a neighboring eNodeB without encapsulation. Thus, the neighboring eNodeB may receive the packet as if it was received directly from the UE. The signal flow of FIG. 13 may include a first eNodeB 120-1 receiving a heartbeat signal from SGW 140 (signal 1310). At a later time, first eNodeB 120-1 may experience a backhaul link failure 1320, and may not receive a subsequent heartbeat signal (signal 1322). In response to not receiving a heartbeat signal, first eNodeB 120-1 may detect a backhaul link failure and may select to relay UE signals to second eNodeB 120-2.

First eNodeB 120-1 may receive a UE packet from UE 110 (signal 1330). First eNodeB 120-1 may transmit the UE packet to second eNodeB 120-2 (signal 1332). Second eNodeB 120-2 may forward the received UE packet to SGW 140 (signal 1334). SGW 140 may associate UE 110 with second eNodeB 120-2, based on receiving the UE packet from second eNodeB 120-2.

SGW 140 may receive a UE packet destined for UE 110. In response, SGW 140 may determine that UE 110 is associated with second eNodeB 120-2 and may forward the received UE packet to second eNodeB 120-2 (signal 1340). Second eNodeB 120-2 may receive the UE packet and may transmit the UE packet via an RF transmitter associated with a cell in which first eNodeB 120-1 is located (signal 1342). First eNodeB 120-1 may receive the UE packet and may re-transmit the UE packet via an RF transmitter associated with a cell in which UE 110 is located (signal 1344).

Figure 14:
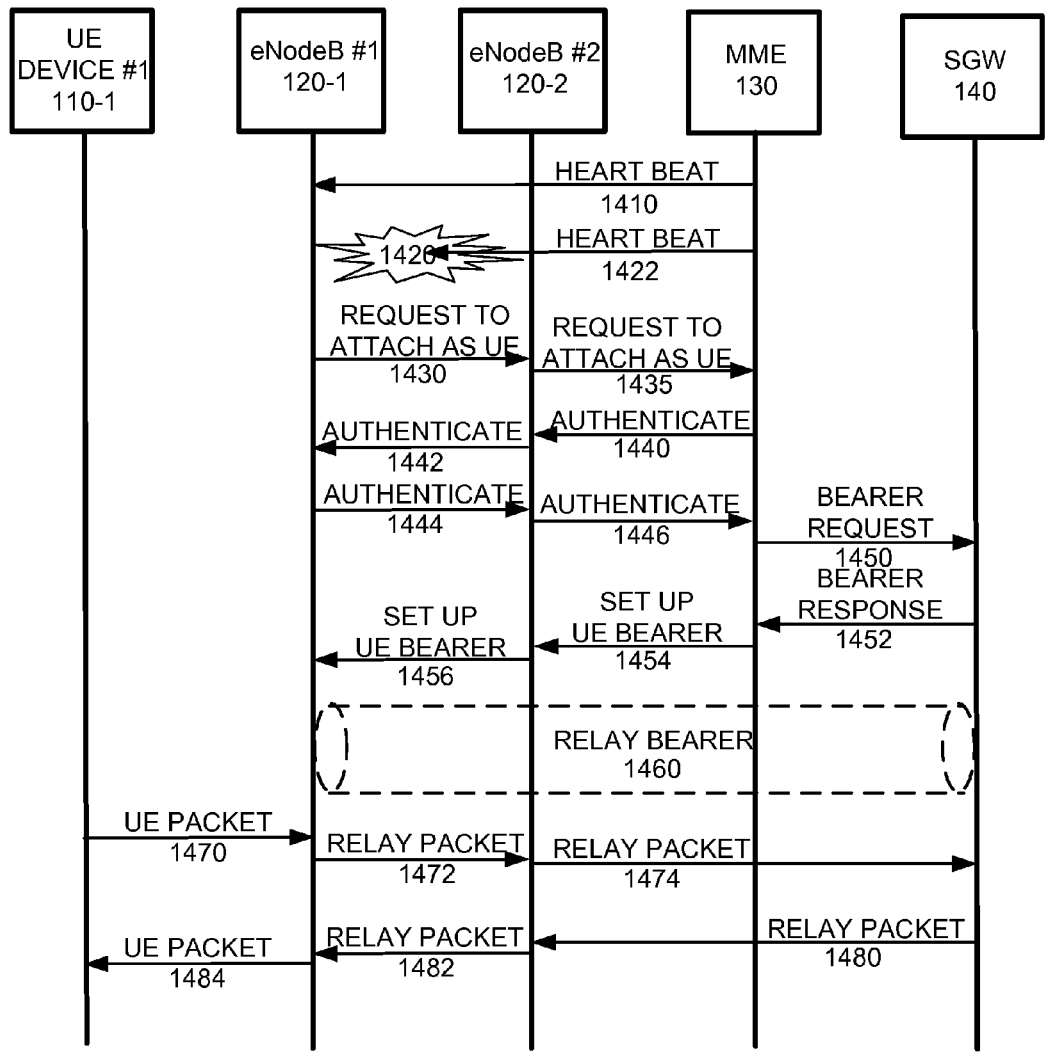
FIG. 14 is a diagram illustrating a second example of a signal flow according to an implementation described herein.

FIG. 14 is a second example of a signal flow according to an implementation described herein. In the example of FIG. 14, a packet from a UE may be encapsulated before being relayed to a neighboring eNodeB. Thus, the neighboring eNodeB may receive the encapsulated packet as a UE packet from a particular eNodeB, which has experienced a backhaul failure, causing the neighboring eNodeB to perceive the particular eNodeB as a UE. Thus, all packets received by the neighboring eNodeB from the particular eNodeB may be perceived as coming from a same UE, even though the received packets may include, encapsulated within, packets from different UEs served by the particular eNodeB.

The signal flow of FIG. 14 may include a first eNodeB 120-1 receiving a heartbeat signal from SGW 140 (signal 1410). At a later time, first eNodeB 120-1 may experience a backhaul link failure 1420, and may not receive a subsequent heartbeat signal (signal 1422). In response to not receiving a heartbeat signal, first eNodeB 120-1 may detect a backhaul link failure and may select to relay UE signals to second eNodeB 120-2.

First eNodeB 120-1 may send an attach request to second eNodeB 120-2 (signal 1430). Second eNodeB 120-2 may forward the attach request to MME device 130 (signal 1435). MME device may send an authentication signal to second eNodeB 120-2 (signal 1440) and second eNodeB 120-2 may forward the authentication signal to first eNodeB 120-1 (signal 1442). First eNodeB 120-1 may respond to the authentication signal by returning authentication information to second eNodeB 120-2 (signal 1444) and second eNodeB 120-2 may forward the authentication signal to MME device 130 (signal 1446).

MME device 130 may proceed to set up a default bearer between first eNodeB 120-1 and SGW 140. MME device 130 may send a bearer request to SGW 140 (signal 1450) and SGW 140 may respond with a bearer response, acknowledging that the bearer that been set up (signal 1452). Thus, relay bearer 1460 may be set up.

First eNodeB 120-1 may receive a UE packet from UE 110 (signal 1470). First eNodeB 120-1 may include the UE packet in a relay packet and may transmit the relay packet to second eNodeB 120-2 (signal 1472). Second eNodeB 120-2 may forward the received relay packet to SGW 140 (signal 1474). SGW 140 may determine that the relay packet includes a UE packet, may retrieve the UE packet, and may forward the UE packet to PGW 150.

SGW 140 may receive a UE packet destined for UE 110. In response, SGW 140 may determine that UE 110 is associated with relay bearer 1460, may include the UE packet in a relay packet, and may forward the relay packet to second eNodeB 120-2 (signal 1480). Second eNodeB 120-2 may receive the relay packet and may transmit the relay packet via an RF transmitter associated with a cell in which first eNodeB 120-1 is located (signal 1472). First eNodeB 120-1 may receive the relay packet, may retrieve the UE packet from the relay packet, and may transmit the UE packet via an RF transmitter associated with a cell in which UE 110 is located (signal 1484).

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 7-11, the order of the blocks may be modified in other implementations. Further, non-dependent blocks may be performed in parallel.

As another example, while particular implementations have been described herein in the context of, or including, eNodeB 120, implementations described herein may also be applied to a system and/or method that include a base station that does not include an LTE eNodeB base station, such as, for example, a Global System for Mobile Communications (GSM) base station.

Also, certain portions of the implementations may have been described as a "component" that performs one or more functions. The term "component" may include hardware, such as a processor, an ASIC, or a FPGA, or a combination of hardware and software (e.g., software running on a processor).

It will be apparent that aspects described herein may be implemented in many different forms of software, firmware, and hardware in the implementations illustrated in the figures. The actual software code or specialized control hardware used to implement aspects does not limit the embodiments. Thus, the operation and behavior of the aspects were described without reference to the specific software code—it being understood that software and control hardware can be designed to implement the aspects based on the description herein.

Even though particular combinations of features are recited in the claims and/or disclosed in the specification, these combinations are not intended to limit the disclosure of the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by a base station in a network, the method comprising:
   detecting, by the base station, a malfunction associated with a backhaul link to the network;
   identifying, by the base station, a plurality of neighboring base stations located within a wireless transmission range of the base station;
   selecting, by the base station, multiple neighboring base stations of the identified plurality of neighboring base stations based on one or more parameters, in response to detecting the malfunction, wherein selecting the multiple neighboring base stations based on one or more parameters includes:
      computing a neighbor score for particular ones of the multiple neighboring base stations based on the one or more parameters; and
      selecting the multiple neighboring base stations based on the computed neighbor scores;
   distributing, by the base station, service for a plurality of user equipment (UE) devices to the selected multiple neighboring base stations;
   receiving, by the base station, a first signal from a UE device; and
   transmitting, by the base station, the first signal to a particular one of the selected multiple neighboring base stations based on the service distribution.

2. The method of claim 1, further comprising:
   receiving a second signal from the particular one of the selected multiple neighboring base stations;
   determining that a particular UE device of the plurality of UE devices is an intended recipient of the second signal; and
   transmitting the second signal to the particular UE device.

3. The method of claim 1, wherein the base station includes one or more cells, and wherein the one or more parameters include an amount of UE traffic associated with a particular one of the one or more cells.

4. The method of claim 1, wherein the one or more parameters include one or more of:
   a capacity of a particular neighboring base station of the identified plurality of neighboring base stations;
   a signal strength associated with the particular neighboring base station;
   a usage score that reflects an amount of UE traffic associated with the particular neighboring base station; or
   a number of UE sessions associated with the particular neighboring base station.

5. The method of claim 1, further comprising:
   receiving, at periodic intervals, a heartbeat signal via the backhaul link from another element of the network; and
   where detecting a malfunction associated with the backhaul link to the network includes one of:
   determining that the heartbeat signal has not been received for a particular length of time; or
   determining, via the heartbeat signal, that an error rate associated with the backhaul link is higher than an error rate threshold.

6. The method of claim 1, wherein selecting the multiple neighboring base stations includes selecting neighboring base stations, of the plurality of neighboring base stations, that have the highest neighbor scores.

7. The method of claim 1, wherein the base station includes one or more cells, and wherein selecting the multiple neighboring base stations includes selecting a neighboring base station, associated with a highest neighbor score, among neighboring base stations associated with a particular cell of the base station.

8. The method of claim 1, further comprising:
   detecting a failure associated with an RF transceiver associated with the base station;
   handing over the plurality of UE devices being served by the base station to the selected multiple neighboring base stations based on the service distribution; and
   shutting down the base station, in response to handing over the plurality of UE devices to the selected multiple neighboring base stations based on the service distribution.

9. The method of claim 1, wherein the base station includes one or more cells, further comprising:
   allocating bandwidth for a cell associated with one of the selected multiple neighboring base stations; and
   using the allocated bandwidth to transmit the signal to the one of the selected multiple neighboring base stations.

10. The method of claim 1, further comprising:
    sending an attach request message to a Mobility Management Entity (MME) device via one of the selected multiple neighboring base stations, wherein the attach request message causes the one of the selected multiple neighboring base stations to process signals from the base station as a UE device served by the one of the selected multiple neighboring base stations.

11. The method of claim 1, further comprising:
    encapsulating packets received from the plurality of UE devices into relay packets before transmitting the received packets to particular ones of the selected multiple neighboring base stations.

12. The method of claim 11, further comprising:
    receiving a relay packet from one of the selected multiple neighboring base stations;
    retrieving a UE packet from the received relay packet;
    determining that a particular one of the plurality of UE devices is an intended recipient of the retrieved UE packet; and
    transmitting the retrieved UE packet to the particular one of the plurality of UE devices.

13. An eNodeB device, associated with a network, comprising:
    a backhaul interface component configured to:
       provide an interface to the network, and
       detect a malfunction associated with the interface;
    a neighbor interface component configured to:
       identify a plurality of neighboring eNodeB devices located within a transmission range of the eNodeB device;
    a neighbor selector component configured to:
       receive an indication of the malfunction from the backhaul interface component,
       receive information relating to the identified plurality of neighboring eNodeB devices,
       select multiple neighboring eNodeB devices of the identified plurality of neighboring eNodeB devices based on one or more parameters, in response to receiving the indication of the malfunction, wherein, when selecting the multiple neighboring eNodeB devices, the neighbor selector component is further configured to:

compute a neighbor score for particular ones of the multiple neighboring eNodeB devices based on the one or more parameters; and select the multiple neighboring eNodeB devices based on the computed neighbor scores; and distribute service for a plurality of user equipment (UE) devices to the selected multiple neighboring eNodeB devices; and wherein the neighbor interface component is configured to:

transmit signals from the plurality of UE devices to the selected multiple neighboring eNodeB devices based on the service distribution.

14. The eNodeB device of claim 13, wherein the one or more parameters include one or more of:

an amount of UE traffic associated with a cell of the eNodeB device, wherein a particular neighboring eNodeB device is associated with the cell;

a capacity of the particular neighboring eNodeB device;

a signal strength associated with the particular neighboring eNodeB device;

a usage score that reflects an amount of UE traffic associated with the particular neighboring eNodeB device; or a number of UE sessions associated with the particular neighboring eNodeB device.

15. The eNodeB device of claim 14, wherein the eNodeB device is associated with one or more cells, and wherein the neighbor selector component is configured to:

perform one of the following:

select a neighboring eNodeB device associated with a highest neighbor score;

select one neighboring eNodeB device per cell, wherein the selected one neighboring eNodeB device is associated with a highest neighbor score among neighboring eNodeB devices associated with the cell; or select a neighboring eNodeB device associated with a particular cell, if the neighboring eNodeB device is associated with a neighbor score higher than a particular threshold.

16. The eNodeB device of claim 13, further comprising:

a relay component configured to:

encapsulate transmission UE packets into transmission relay packets prior to transmission of the UE packets to particular ones of the selected multiple neighboring eNodeB devices;

receive, from particular ones of the selected multiple neighboring eNodeB devices, reception relay packets; and retrieve reception UE packets from the received reception relay packets.

17. The eNodeB device of claim 13, further comprising:

a traffic manager configured to:

allocate bandwidth for a radio frequency (RF) transceiver to transmit signals from the plurality of UE devices to particular ones of the selected multiple neighboring eNodeB devices.

18. One or more non-transitory computer-readable memory devices storing instructions executable by one or more processors, the one or more non-transitory computer-readable memory devices comprising:

one or more instructions to detect a malfunction associated with a backhaul link, wherein the backhaul link provides a connection between an eNodeB and a network;

one or more instructions to identify a plurality of neighboring eNodeBs located within a transmission range of the eNodeB;

one or more instructions to select multiple neighboring eNodeBs, of the plurality of neighboring eNodeBs, based on one or more parameters, in response to detecting the malfunction, wherein the one or more instructions to select the multiple neighboring eNodeBs further include:

one or more instructions to compute a neighbor score for particular ones of the multiple neighboring eNodeBs based on the one or more parameters; and one or more instructions to select the multiple neighboring eNodeBs based on the computed neighbor scores;

one or more instructions to distribute service for a plurality of user equipment (UE) devices to the selected multiple neighboring eNodeBs;

one or more instructions to allocate bandwidth for a radio frequency (RF) transceiver, associated with the eNodeB, to transmit signals from the plurality of UE devices to the selected multiple neighboring eNodeBs;

one or more instructions to receive, using the RF transceiver, or a different RF transceiver associated with the eNodeB, a signal from a UE device of the plurality of UE devices; and one or more instructions to transmit, using the RF transceiver, or a different RF transceiver associated with the eNodeB, the signal to the selected multiple neighboring eNodeBs based on the service distribution.

* * * * *